United States Patent
Wang et al.

(10) Patent No.: US 10,779,303 B2
(45) Date of Patent: Sep. 15, 2020

(54) INTER-RADIO ACCESS TECHNOLOGY CARRIER AGGREGATION

(71) Applicant: Google LLC, Mountain View, CA (US)

(72) Inventors: Jibing Wang, Saratoga, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 30 days.

(21) Appl. No.: 16/126,920

(22) Filed: Sep. 10, 2018

(65) Prior Publication Data

US 2019/0182850 A1 Jun. 13, 2019

Related U.S. Application Data

(60) Provisional application No. 62/597,797, filed on Dec. 12, 2017.

(51) Int. Cl.
*H04L 1/18* (2006.01)
*H04W 76/15* (2018.01)
(Continued)

(52) U.S. Cl.
CPC ....... *H04W 72/1215* (2013.01); *H04L 1/1812* (2013.01); *H04L 5/001* (2013.01);
(Continued)

(58) Field of Classification Search
CPC ....... H04W 74/0808; H04W 72/04046; H04W 72/1284; H04B 7/0417; H04L 1/1812
See application file for complete search history.

(56) References Cited

U.S. PATENT DOCUMENTS

| 5,543,811 A | 8/1996 | Chethik |
| 6,711,224 B1 | 3/2004 | Benning et al. |

(Continued)

FOREIGN PATENT DOCUMENTS

| EP | 3081041 | 10/2016 |
| EP | 3105958 | 12/2016 |

(Continued)

OTHER PUBLICATIONS

"International Search Report and Written Opinion", PCT Application No. PCT/2018/050487, dated Nov. 26, 2018, 13 pages.

(Continued)

*Primary Examiner* — Iqbal Zaidi
(74) *Attorney, Agent, or Firm* — Colby Nipper PLLC

(57) ABSTRACT

The present disclosure describes methods and apparatuses for inter-radio access technology carrier (RAT) aggregation. In aspects, a user device (102) establishes a wireless link (106) for communicating with one or more base stations (104, 202) via a first component carrier (214) and a second component carrier (208, 220). The first component carrier uses a (RAT) having a first transmission time interval (TTI) and the second component carrier uses a second RAT having a second, different TTI. The user device receives user plane data via the second component carrier and analyzes the user plane data to determine whether data packets of the user plane data were successfully or unsuccessfully received by the user device (804, 806). The user device then transmits, via a next available uplink subframe or time slot of the first component carrier of the first RAT, a feedback communication based on which data packets were successfully received (808).

20 Claims, 11 Drawing Sheets

(51) Int. Cl.
  *H04W 88/06* (2009.01)
  *H04W 72/12* (2009.01)
  *H04W 72/04* (2009.01)
  *H04L 5/00* (2006.01)

(52) U.S. Cl.
  CPC .......... *H04L 5/0055* (2013.01); *H04L 5/0092* (2013.01); *H04L 5/0098* (2013.01); *H04W 72/0446* (2013.01); *H04W 76/15* (2018.02); *H04W 88/06* (2013.01)

(56) References Cited

U.S. PATENT DOCUMENTS

| | | |
|---|---|---|
| 8,315,185 B2 | 11/2012 | Chan |
| 8,346,286 B2 | 1/2013 | Lee et al. |
| 8,543,063 B2 | 9/2013 | Bergel et al. |
| 8,594,053 B2 | 11/2013 | Kim et al. |
| 8,605,644 B2 | 12/2013 | Wang |
| 8,774,150 B1 | 7/2014 | Jeffery et al. |
| 9,060,324 B1 | 6/2015 | Goyal et al. |
| 9,204,441 B2 | 12/2015 | Nagaraja et al. |
| 9,253,766 B2 | 2/2016 | Yang et al. |
| 9,258,798 B2 | 2/2016 | Li et al. |
| 9,271,290 B2 | 2/2016 | Pelletier et al. |
| 9,414,430 B2 | 8/2016 | Vajapeyam et al. |
| 9,425,923 B2 | 8/2016 | Ratasuk et al. |
| 9,686,667 B2 | 6/2017 | Artuso |
| 9,900,133 B2 | 2/2018 | Lu et al. |
| 10,148,329 B2 | 12/2018 | Yue et al. |
| 10,375,671 B2 | 8/2019 | Stauffer et al. |
| 10,608,721 B2 | 3/2020 | Wang et al. |
| 2005/0047322 A1 | 3/2005 | Sondur |
| 2007/0018630 A1 | 1/2007 | Oehm |
| 2008/0018427 A1 | 1/2008 | Ezra et al. |
| 2009/0102715 A1 | 4/2009 | Lou et al. |
| 2009/0180451 A1 | 7/2009 | Alpert et al. |
| 2010/0194650 A1 | 8/2010 | Goransson et al. |
| 2011/0002373 A1 | 1/2011 | Jeon |
| 2011/0205981 A1 | 8/2011 | Koo et al. |
| 2012/0039280 A1 | 2/2012 | Chen et al. |
| 2012/0140743 A1 | 6/2012 | Pelletier et al. |
| 2012/0208547 A1 | 8/2012 | Geirhofer et al. |
| 2012/0275384 A1 | 11/2012 | Long et al. |
| 2013/0012141 A1 | 1/2013 | Harnishfeger |
| 2013/0301454 A1 | 11/2013 | Seol et al. |
| 2014/0146732 A1 | 5/2014 | Olufunmilo et al. |
| 2014/0148107 A1 | 5/2014 | Maltsev et al. |
| 2014/0362752 A1 | 12/2014 | Jha et al. |
| 2015/0208458 A1 | 7/2015 | Pelletier et al. |
| 2015/0289147 A1 | 10/2015 | Lou et al. |
| 2015/0349741 A1 | 12/2015 | Lehtola et al. |
| 2015/0382205 A1 | 12/2015 | Lee et al. |
| 2016/0029235 A1 | 1/2016 | Kim et al. |
| 2016/0050002 A1 | 2/2016 | Wei et al. |
| 2016/0072564 A1 | 3/2016 | Li et al. |
| 2016/0076945 A1 | 3/2016 | Huang et al. |
| 2016/0099763 A1 | 4/2016 | Chen |
| 2016/0135213 A1 | 5/2016 | Zhu et al. |
| 2016/0179124 A1 | 6/2016 | Madan et al. |
| 2016/0205679 A1 | 7/2016 | Yoo et al. |
| 2016/0226640 A1 | 8/2016 | Seol et al. |
| 2016/0234736 A1 | 8/2016 | Kubota et al. |
| 2016/0270027 A1 | 9/2016 | Ang et al. |
| 2016/0277225 A1 | 9/2016 | Frenne et al. |
| 2016/0286524 A1 | 9/2016 | Griot et al. |
| 2016/0294531 A1 | 10/2016 | Loehr et al. |
| 2016/0353424 A1 | 12/2016 | Stirling-Gllacher et al. |
| 2017/0026293 A1 | 1/2017 | Desclos et al. |
| 2017/0026962 A1 | 1/2017 | Liu et al. |
| 2017/0104561 A1 | 4/2017 | Agardh et al. |
| 2017/0134913 A1 | 5/2017 | Cui et al. |
| 2017/0149480 A1 | 5/2017 | Kakishima et al. |
| 2017/0180095 A1 | 6/2017 | Xue et al. |
| 2017/0195031 A1 | 7/2017 | Onggonsanusi et al. |
| 2017/0201982 A1 | 7/2017 | Alvarino et al. |
| 2017/0208589 A1* | 7/2017 | Majjigi ................ H04L 5/0005 |
| 2017/0223744 A1 | 8/2017 | Qian et al. |
| 2017/0257842 A1 | 9/2017 | Hessler et al. |
| 2017/0310417 A1 | 10/2017 | Jung et al. |
| 2017/0331577 A1 | 11/2017 | Parkvall et al. |
| 2017/0331670 A1 | 11/2017 | Parkvall et al. |
| 2017/0347334 A1 | 11/2017 | Akkarakaran et al. |
| 2017/0367046 A1 | 12/2017 | Papasakellariou |
| 2017/0367069 A1 | 12/2017 | Agiwal et al. |
| 2017/0374579 A1 | 12/2017 | Wang et al. |
| 2018/0020462 A1* | 1/2018 | Xiong ................ H04W 72/1215 |
| 2018/0077734 A1 | 3/2018 | Kim et al. |
| 2018/0109353 A1 | 4/2018 | Kwak et al. |
| 2018/0139014 A1 | 5/2018 | Xiong et al. |
| 2018/0139701 A1 | 5/2018 | Want et al. |
| 2018/0191415 A1 | 7/2018 | Aryafar et al. |
| 2018/0206217 A1 | 7/2018 | Martin et al. |
| 2018/0213529 A1 | 7/2018 | Lee et al. |
| 2018/0227902 A1 | 8/2018 | Gholmieh et al. |
| 2018/0227960 A1 | 8/2018 | Belghoul et al. |
| 2018/0242160 A1 | 8/2018 | Morita et al. |
| 2018/0279303 A1 | 9/2018 | Sun et al. |
| 2018/0332605 A1 | 11/2018 | Pelletier |
| 2018/0343043 A1 | 11/2018 | Hakola et al. |
| 2018/0367230 A1 | 12/2018 | Su et al. |
| 2019/0007844 A1 | 1/2019 | Müller et al. |
| 2019/0037560 A1* | 1/2019 | Huang ................ H04W 52/325 |
| 2019/0037586 A1 | 1/2019 | Park et al. |
| 2019/0052419 A1 | 2/2019 | Yang et al. |
| 2019/0058516 A1 | 2/2019 | Yang et al. |
| 2019/0089436 A1 | 3/2019 | Wei et al. |
| 2019/0089506 A1 | 3/2019 | Takeda et al. |
| 2019/0123798 A1 | 4/2019 | Lou et al. |
| 2019/0132830 A1 | 5/2019 | Tabet et al. |
| 2019/0141767 A1 | 5/2019 | Wang et al. |
| 2019/0159140 A1 | 5/2019 | Wang et al. |
| 2019/0173626 A1 | 6/2019 | Wang et al. |
| 2019/0174433 A1 | 6/2019 | Nory et al. |
| 2019/0190577 A1 | 6/2019 | Wang et al. |
| 2019/0190641 A1 | 6/2019 | Wang et al. |
| 2019/0190676 A1 | 6/2019 | Wang et al. |
| 2019/0191440 A1 | 6/2019 | Wang et al. |
| 2019/0200322 A1 | 6/2019 | Wang et al. |
| 2019/0229789 A1 | 7/2019 | Zhang et al. |
| 2019/0230603 A1 | 7/2019 | Liu et al. |
| 2019/0230607 A1 | 7/2019 | Chung et al. |
| 2019/0239168 A1 | 8/2019 | Li et al. |
| 2019/0288809 A1 | 9/2019 | Iyer et al. |
| 2019/0306830 A1 | 10/2019 | Wang et al. |
| 2019/0342825 A1 | 11/2019 | Liu |
| 2019/0349968 A1 | 11/2019 | Yerramalli et al. |
| 2019/0356368 A1 | 11/2019 | Liu et al. |
| 2019/0380140 A1 | 12/2019 | Wong et al. |
| 2020/0028745 A1 | 1/2020 | Parkvall et al. |

FOREIGN PATENT DOCUMENTS

| | | |
|---|---|---|
| EP | 3123802 | 2/2017 |
| EP | 3443704 | 2/2019 |
| WO | 2013070149 | 5/2013 |
| WO | 2015086215 | 6/2015 |
| WO | 2012074878 | 7/2015 |
| WO | 2016119882 | 8/2016 |
| WO | 2016133106 | 8/2016 |
| WO | 2016204811 | 12/2016 |
| WO | 2017011802 | 1/2017 |
| WO | 2017025366 | 2/2017 |
| WO | 2017030601 | 2/2017 |
| WO | 2017083514 | 5/2017 |
| WO | 2017088898 | 6/2017 |
| WO | 2017109549 | 6/2017 |
| WO | 2017111987 | 6/2017 |
| WO | 2017117340 | 7/2017 |
| WO | 2017127126 | 7/2017 |
| WO | 2017146773 | 8/2017 |
| WO | 2017150863 | 9/2017 |
| WO | 2017195463 | 11/2017 |
| WO | 2017196243 | 11/2017 |
| WO | 2018031846 | 2/2018 |

(56) References Cited

FOREIGN PATENT DOCUMENTS

| WO | 2018034998 | 2/2018 |
|---|---|---|
| WO | 2018064068 | 4/2018 |
| WO | 2019094078 | 5/2019 |
| WO | 2019112648 | 6/2019 |
| WO | 2019118021 | 6/2019 |
| WO | 2019118023 | 6/2019 |
| WO | 2019118787 | 6/2019 |
| WO | 2019118915 | 6/2019 |
| WO | 2019126791 | 6/2019 |
| WO | 2019193768 | 10/2019 |

OTHER PUBLICATIONS

"International Search Report and Written Opinion", PCT Application No. PCT/US2018/049407, dated Dec. 14, 2018, 18 pages.
"First Action Interview Office Action", U.S. Appl. No. 15/844,093, dated Sep. 16, 2019, 4 Pages.
"Non-Final Office Action", U.S. Appl. No. 15/832,395, dated Aug. 30, 2019, 20 Pages.
"Non-Final Office Action", U.S. Appl. No. 16/446,416, dated Oct. 18, 2019, 7 Pages.
"Written Opinion of the International Preliminary Examining Authority", PCT Application No. PCT/US2018/049407, dated Oct. 21, 2019, 8 pages.
"Written Opinion of the International Searching Authority", PCT Application No. PCT/US2018/046004, dated Oct. 21, 2019, 6 pages.
"Dragonfly Narrowband IoT Unveiled with GNSS Option", GPS World Staff; Retrieved from http://gpsworld.com/dragonfly-narrowband-iot-unveiled-with-gnss-option/ on Dec. 7, 2017, Mar. 7, 2017, 5 pages.
"Leading the LTE IoT Evolution to Connect the Massive Internet of Things", Qualcomm, Inc., Jun. 2017, 41 pages.
"NB-IOT, Accelerating Cellular IOT", Huawei; Roads to MBB 2020; Building a Better Connected World; Global Mobile Broadband Forum 2015; Hong Kong, Nov. 2-5, 2015, 4 pages.
"Restriction Requirement", U.S. Appl. No. 15/852,572, dated Jun. 11, 2018, 9 pages.
Dutta, et al., "Frame Structure Design and Analysis for Millimeter Wave Cellular Systems", avix.org; NYU Wireless, New York University Tandon School of Engineering, Aug. 20, 2016, 31 pages.
Jantti, "Machine Type Communications for Internet of Things—Recent advances and future possibilities", WNCG; Seminar, Oct. 7, 2016, 1 page.
Landstrom, et al., "NB-IOT: A Sustainable Technology for Connecting Billions of Devices", Ericsson Technology Review; Standardizing Narrowband IoT, Apr. 22, 2016, 12 pages.
Pederson, et al., "A Flexible Frame Structure for 5G Wide Area", Aalborg University, Proceedings of IEEE VTC Fall-2015, 2015, 6 pages.
"3rd Generation Partnership Project", Technical Specification Group Radio Access Network; NR and NG-RAN Overall; 3GPP Standard; Technical Specification; 3GPP TS 38.300, 3rd Generation Partnership Project (3GPP), Mobile Competence Centre, Nov. 17, 2017, 56 pages.
"3rd Generation Partnership Project; Technical Specification Group Radio Access Network", Evolved Universal Terrestrial Radio Access (E-UTRA) and NR; Multi-connectivity; Stage 2 (Release 15); 3GPP Standard; Technical Specification; 3GPP TS 37.340, 3rd Generation Partnership Project (3GPP), Mobile Competence Centre, Nov. 17, 2017, 49 pages.
"International Search Report and Written Opinion", PCT Application No. PCT/US2018/041696, dated Oct. 9, 2018, 30 pages.
"International Search Report and Written Opinion", PCT Application No. PCT/US2018/046004, dated Nov. 22, 2018, 13 pages.
"Non-Final Office Action", U.S. Appl. No. 15/852,572, dated Sep. 14, 2018, 6 pages.
"Restriction Requirement", U.S. Appl. No. 15/842,318, dated Oct. 4, 2018, 7 pages.
"Evolved Universal Terrestrial Radio Access (E-UTRA)", 3rd Generation Partnership Project; Technical Specification Group Radio Access Network; Evolved Universal Terrestrial Radio Access (E-UTRA); Radio Resource Control (RRC); Protocol specification (Release 10), Mar. 2013, 307 pages.
"First Action Interview Office Action", U.S. Appl. No. 15/842,318, dated May 7, 2019, 3 pages.
"International Search Report and Written Opinion", PCT Application No. PCT/US2018/067367, dated Mar. 20, 2019, 19 pages.
"Invitation to Pay Additional Fees", PCT Application No. PCT/US2018/065557, dated Mar. 13, 2019, 19 pages.
"Invitation to Pay Additional Fees", PCT Application No. PCT/US2018/065829, dated Mar. 15, 2019, 13 pages.
"Non-Final Office Action", U.S. Appl. No. 15/832,395, dated Feb. 27, 2019, 18 pages.
"Non-Final Office Action", U.S. Appl. No. 15/842,241, dated Mar. 11, 2019, 12 pages.
"Notice of Allowance", U.S. Appl. No. 15/852,572, dated Mar. 11, 2019, 5 pages.
"Pre-Interview Communication", U.S. Appl. No. 15/842,318, dated Mar. 29, 2019, 4 pages.
"Final Office Action", Application No. 15842318, dated Jul. 10, 2019, 15 Pages.
"International Search Report and Written Opinion", PCT Application No. PCT/US2018/065829, dated Jun. 18, 2019, 28 pages.
"International Search Report and Written Opinion", PCT Application No. PCT/US2018/065557, dated Jun. 21, 2019, 38 pages.
"Non-Final Office Action", U.S. Appl. No. 15/939,060, dated May 23, 2019, 15 pages.
"Notice of Allowance", U.S. Appl. No. 15/842,241, dated Aug. 5, 2019, 6 pages.
"Pre-Interview Communication", U.S. Appl. No. 15/844,093, dated Jun. 28, 2019, 5 pages.
"Final Office Action", U.S. Appl. No. 15/832,395, 23 Pages.
"Final Office Action", U.S. Appl. No. 15/939,060, dated Nov. 29, 2019, 17 pages.
"International Preliminary Report on Patentability", PCT Application No. PCT/US2018/046004, dated Jan. 23, 2020, 21 pages.
"International Preliminary Report on Patentability", PCT Application No. PCT/US2018/067367, dated Mar. 17, 2020, 23 pages.
"Non-Final Office Action", U.S. Appl. No. 16/105,948, dated Mar. 27, 2020, 21 Pages.
"Notice of Allowance", U.S. Appl. No. 15/844,093, dated Mar. 2, 2020, 10 Pages.
"Notice of Allowance", U.S. Appl. No. 15/842,241, dated Dec. 5, 2019, 5 Pages.
"Written Opinion", PCT Application No. PCT/US2018/065557, dated Nov. 15, 2019, 4 pages.
"Written Opinion of the International Preliminary Examining Authority", PCT Application No. PCT/US2018/065557, dated Feb. 4, 2020, 13 pages.
"Foreign Office Action", European Application No. 18830637.7, dated Jul. 7, 2020, 7 pages.
"International Preliminary Report on Patentability", PCT Application No. PCT/US2018/041696, dated Jun. 18, 2020, 14 pages.
"International Preliminary Report on Patentability", PCT Application No. PCT/US2018/049407, dated Jun. 25, 2020, 12 pages.
"International Preliminary Report on Patentability", PCT Application No. PCT/US2018/065829, dated Jun. 25, 2020, 20 pages.
"International Preliminary Report on Patentability", PCT Application No. PCT/US2018/065557, dated Jun. 25, 2020, 29 pages.
"Notice of Allowance", U.S. Appl. No. 15/844,093, dated May 13, 2020, 11 Pages.

\* cited by examiner

900

```
┌─────────────────────────────────────────────────────────┐
│ Establish a wireless link for communicating with a user │
│ device over a wireless network, the wireless link       │
│ including a first component carrier of a first radio    │
│ access technology (RAT) facilitating communication      │
│ between the base station and the user device            │
│                         902                             │
└─────────────────────────────────────────────────────────┘
                            ↓
┌─────────────────────────────────────────────────────────┐
│ Receive a feedback communication, the feedback          │
│ communication received via the first component carrier  │
│ and including feedback for user plane data received by  │
│ the user device via a second component carrier of the   │
│ wireless link, the second component carrier of the      │
│ wireless link provided by a second base station of the  │
│ wireless network                                        │
│                         904                             │
└─────────────────────────────────────────────────────────┘
                            ↓
┌─────────────────────────────────────────────────────────┐
│ Communicate, to another device of the wireless network, │
│ the feedback communication relating to the second       │
│ component carrier of the second RAT                     │
│                         906                             │
└─────────────────────────────────────────────────────────┘
```

FIG. 9

INTER-RADIO ACCESS TECHNOLOGY CARRIER AGGREGATION

RELATED APPLICATIONS

This application is a continuation of and claims priority to U.S. Provisional Patent Application Ser. No. 62/597,797, filed Dec. 12, 2017, and titled "Inter-Radio Access Technology Carrier Aggregation," the disclosure of which is incorporated by reference in its entirety.

BACKGROUND

Many user devices communicate over a wireless network provided by network nodes. Because of advances in wireless standards, a single user device may be configurable to communicate, via the wireless network, using multiple wireless standards. For example, when a user device is out of range of a wireless link to the wireless network using a state-of-the-art radio access technology (RAT), the user device may instead communicate with the wireless network using a less-advanced RAT. However, most user devices are configured to communicate wirelessly using only a single wireless standard at a time.

As part of communicating over the wireless network, user devices send and receive user plane data and control plane data. The user plane data may include user data such as application data (e.g., voice and data services) or feedback communications. The control plane data may include signaling traffic such as wireless link configuration data, wireless link control data, status indications, queries, or scheduling requests. The feedback communication uses communication resources of the wireless link and reduces an amount of resources that could otherwise be used for communication of application data. However, this feedback communication may be essential to maintaining an adequate quality, to determine errors, and to allow for communications over the wireless link.

SUMMARY

This document describes techniques for, and systems that enable, inter-radio access technology carrier aggregation ("inter-RAT carrier aggregation" or "Inter-RAT CA"), for aggregating component carriers (e.g., channels) of a wireless link that have different transmission time intervals (TTIs). In some aspects, the techniques include establishing, via the transceiver of a user device, a wireless link for communicating with one or more base stations of a wireless network. The wireless link includes a first component carrier of a first radio access technology (RAT) having a first TTI. The wireless link also includes a second component carrier of a second, different RAT having a second, different TTI. The user device receives user plane data from one of the base stations via the second component carrier of the second RAT. The user plane data is analyzed by the user device to determine whether data packets of the user plane data were successfully or unsuccessfully received by the user device. The user device then transmits, to the base station, a feedback communication based on which data packets of the user plane data were successfully received. The feedback communication is transmitted via a next available uplink subframe or time slot of the first component carrier of the first RAT.

These techniques and systems may be implemented, for instance, in wireless networks that implement two or more wide-band (e.g., 20 MHz to 1 GHz) communication protocols, such as a $4^{th}$ generation (4G) Long Term Evolution (LTE) wireless network (also referred to as "LTE"), an LTE advanced wireless network, or a $5^{th}$ generation (5G) new radio (NR) wireless network. These techniques and systems may be particularly beneficial to aggregate an advanced cellular network protocol, such as 5G NR, with a less-advanced cellular network protocol, such as LTE. A component carrier of the less-advanced RAT of a wireless link can be used to communicate user plane data, such as feedback communications, for another component carrier of a 5G NR RAT, thereby making available additional user plane resources of the other component carrier for communicating application data. However, an advanced cellular network protocol may have a different TTI than a less-advanced cellular network protocol, which may cause difficulty in timing a carrier aggregation communication, such as a feedback communication. A TTI refers to a time duration, and therefore numerology, of a subframe or time slot of a RAT.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of inter-radio access technology carrier aggregation for wireless networks is described below. The use of the same reference numbers in different instances in the description and the figures may indicate like elements:

FIG. 9 illustrates another example method for inter-radio access technology carrier aggregation.

DETAILED DESCRIPTION

Generally, a user device communicates with a wireless network through a wireless link. The wireless link often includes one or more component carriers, which use radio access technologies (RATs) for communication. Different RATs may have different transmission time intervals (TTI) that provide a time domain for communicating over the wireless network. The wireless network includes network nodes, such as base stations, which transmit and receive user plane data with a user device via one of the component carriers using a RAT. As part of communicating via the component carrier, the base station and the user device share feedback communications, such as acknowledgement/negative acknowledgment (ACK/NACK) messages, for other user plane data received over the component carrier. The feedback communication uses communication resources, however, that could otherwise be used for communication of application data.

This document describes techniques and systems for inter-radio access technology carrier aggregation for RATs having different TTIs. These techniques include transmitting feedback communications, via a first component carrier of a first RAT, for user plane data received via a second component carrier of a second RAT. The user plane data is analyzed and then transmitted based on a next available uplink subframe of the first component carrier.

In an example implementation of inter-radio access technology carrier aggregation, a user device establishes a wireless link with a base station via a first component carrier using a first RAT, such as 4G LTE, and a second component carrier using a second RAT, such as 5G NR. The 5G NR-based second component carrier has a TTI that differs from a TTI of the LTE-based first component carrier. After receiving user plane data over the second component carrier, the user device analyzes the user plane data to determine which data packets were received successfully or unsuccessfully. The base station then transmits a feedback communication via a next available uplink subframe or time slot of the first component carrier. In this way, the feedback is scheduled based on scheduling of the first component carrier, rather than the second component carrier to which the feedback relates.

The following discussion describes an operating environment, an example networking environment in which devices of the operating environment may be implemented, and techniques that may be employed in one or both of the operating environment or network environment. In the context of the present disclosure, reference is made to the operating environment or networking environment by way of example only.

Operating Environment

Figure 1:
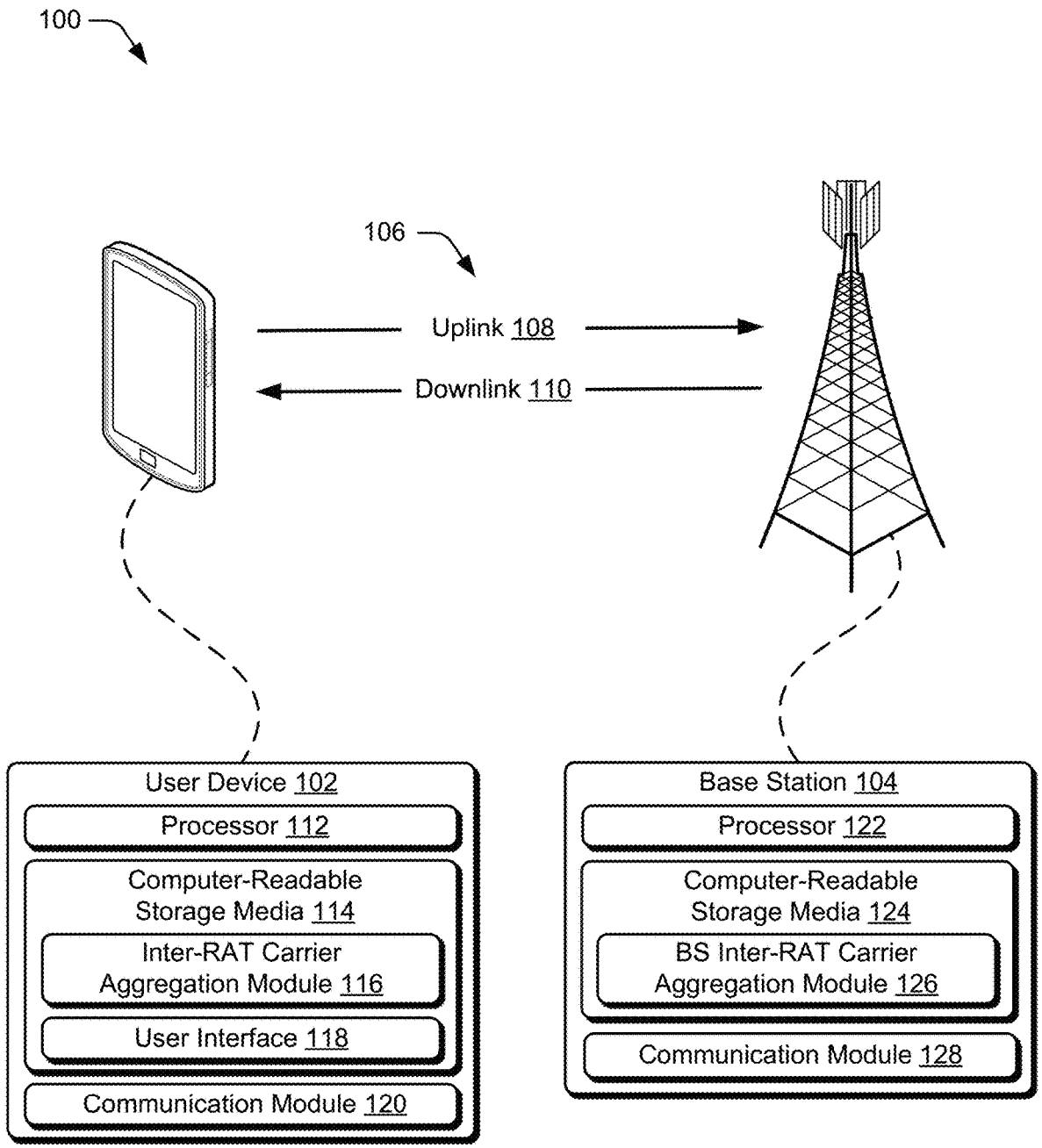
FIG. 1 illustrates example device configurations of a user device and a base station in accordance with one or more aspects of inter-radio access technology carrier aggregation.

FIG. 1 illustrates an example operating environment 100 in which devices for Inter-RAT CA can be implemented. In this example, the operating environment includes a user device 102 and a base station 104 that are respectively configured to communicate over a wireless link 106 of a wireless network. Generally, the wireless link 106 includes an uplink 108 by which the user device 102 transmits data or information to the base station 104 and a downlink 110 by which the base station 104 transmits other data or other information to the user device 102. The wireless link 106 may be implemented in accordance with any suitable protocol or standard, such as a Global System for Mobile Communications (GSM), Worldwide Interoperability for Microwave Access (WiMax), a High Speed Packet Access (HSPA), Evolved HSPA (HSPA+) protocol, an LTE protocol (e.g., 4G), an LTE Advanced protocol, or 5G NR. Although shown or described with reference to a separate uplink 108 or downlink 110, communication between the user device 102 and base station 104 may also be referred to as a wireless connection, wireless association, frame exchange, or a communication link.

The user device 102 includes a processor 112, computer-readable storage media 114 having an Inter-RAT CA module 116 and a user interface 118, and a communication module 120. As used herein, a module is based in hardware, software, or a combination of the two. The user device 102 is illustrated as a smart phone, however the user device 102 may instead be implemented as any device with wireless communication capabilities, such as a mobile gaming console, a tablet, a laptop, an advanced driver assistance system (ADAS), a point-of-sale (POS) terminal, a health monitoring device, a drone, a camera, a media-streaming dongle, a wearable smart-device, an internet-of-things (IoT) device, a personal media device, a navigation device, a mobile-internet device (MID), a wireless hotspot, a femtocell, or a broadband router.

The processor 112 of the user device 102 can execute processor-executable instructions or code stored by the computer-readable storage media (CRM) 114 to cause the user device 102 to perform operations or implement various device functionalities. In some cases, the processor 112 is implemented as an application processor (e.g., multicore processor) or a system-on-chip with other components of the user device 102 integrated therein. The CRM 114 may include any suitable type of memory media or storage media, such as read-only memory (ROM), programmable ROM (PROM), random access memory (RAM), static RAM (SRAM), or flash memory. In the context of this discussion, the CRM 114 of the user device 102 is implemented as hardware-based storage media, which does not include transitory signals or carrier waves. In some cases, the CRM 114 stores one or more of firmware, an operating system, or applications of the user device 102 as instructions, code, or information. The instructions or code can be executed by the processor 112 to implement various functionalities of the user device 102, such as those related to network access or audio encoding features. In this example, the CRM 114 also stores processor-executable code or instructions for implementing one or more of the Inter-RAT CA module 116 or the user interface 118 the user device 102.

In some aspects, the Inter-RAT CA module 116 may prepare user plane data for communication via a first component carrier of the wireless link 106 using a first RAT. The user plane data may include a feedback communication, such as an acknowledgement/negative acknowledgement (ACK/NACK) communication, related to other user plane data received over a second component carrier of the wireless link 106 using a second RAT. The first RAT may have a TTI that is different from a TTI of the second RAT, which may cause variance from a standard transmission time for feedback related to the second component carrier. The Inter-RAT CA module 116 aggregates user plane data relating to the second component carrier for sending via a next available uplink subframe or time slot of a component carrier of the first RAT. The Inter-RAT CA module 116 then transmits, via the communication module 120, the aggregated user plane data to the base station 104.

The control plane data may include, for example, device status information, wireless link status information, wireless link control information, data requests, instructions, or network access requests. More specifically, the control plane data may include a buffer status report including a status of data to be transmitted via the second component carrier of the second RAT and/or a status of data transmitted via the first component carrier of the first RAT. Additionally or alternatively, the control plane data includes a measurement report including signal quality data for the second component carrier of the second RAT and/or signal quality for the first component carrier of the first RAT. The control plane data may be transmitted via various communication channels of the uplink 108, such as a physical uplink control channel (PUCCH) or a physical uplink share channel (PUSCH). Further, the control plane data may be transmitted as a unique communication, a portion of a preamble, or medium access control (MAC) layer of a communication packet.

The user interface 118 may provide a notification of carrier aggregation of multiple component carriers of different RATs. Additionally or alternatively, the user interface 118 may provide a menu for receiving a selection to enter an Inter-RAT CA mode. These are but a few implementations of the Inter-RAT CA module 116 and the user interface 118, which are described in further detail below.

The communication module 120 of the user device 102 includes a hardware-based transceiver including a receiver, a transmitter, and associated circuitry or other components for communicating with the base station 104 via a wireless medium. For example, the communication module 120 may transmit, via the transmitter, data to the base station 104 via the uplink 108. This data or information transmitted to the base station 104 may include any suitable type of framed or packetized information formatted as user plane data or control plane data. The communication module 120 may also receive, via the receiver, any suitable type of user plane data or control plane data from the base station 104.

In this example, the base station 104 is shown generally as a cellular base station of a wireless network. The base station 104 may be implemented to manage one or more cells of a wireless network, which includes multiple other base stations that each manage additional respective cells of the wireless network. As such, the base station 104 may communicate with a network management entity or other base stations to coordinate connectivity or hand-offs of mobile stations within or across the cells of the wireless network. The base station 104 can be configured as any suitable type of base station or network management node, such as GSM base station, a node base (Node B) transceiver station (e.g., for UMTS), an evolved NodeB (eNB, e.g., for LTE), or a next generation Node B (gNB, e.g., for 5G NR). As such, the base station 104 may control or configure parameters of the uplink 108 or the downlink 110 in accordance with one or more of the wireless standards or protocols described herein.

The base station 104 includes a processor 122, a computer-readable storage media (CRM) 124 having a base station (BS) inter-RAT carrier aggregation module 126, and a communication module 128. The processor 122 can execute processor-executable instructions or code stored by the CRM 124 to perform operations or implement various base station functionalities. In some cases, the processor 122 is implemented as multiple processor cores or a multicore processor configured to execute firmware or an operating system of the base station 104. The CRM 124 may include any suitable type of memory media or storage media, such as ROM, PROM, RAM, SRAM, or flash memory. In the context of this discussion, the CRM 124 is implemented as hardware-based storage media, which does not include transitory signals or carrier waves. The CRM 124 of the base station 104 may store firmware, an operating system, or applications of the base station 104 as instructions, code, or other information. The instructions or code can be executed by the processor 122 to implement various functionalities of the base station 104, such as to manage connectivity or parameters of the wireless link 106 with the user device 102. In this example, the CRM 124 also stores processor-executable code or instructions for implementing the base station inter-RAT carrier aggregation module 126 of the base station 104.

In some aspects, the base station inter-RAT carrier aggregation module 126 of the base station 104 is implemented to perform various functions associated with Inter-RAT CA for a first component carrier of a first RAT and a second component carrier of a second RAT. The base station inter-RAT carrier aggregation module 126 is executable by the processor 122 to aggregate user plane data for communication over a first component carrier of a first RAT between the user device 102 and the base station 104. The user plane data includes data, such as feedback, relating to communication of either the first component carrier of the first RAT or the second component carrier of the second RAT. The communication over the second component carrier of the second RAT may be between the user device 102 and a different transceiver of the base station 104, or between the user device 102 and another base station.

The user plane data transmitted by the base station 104 may include a hybrid automatic repeat request (HARQ) communication. In some implementations, the user plane data includes a radio resource control (RRC) connection configuration (or reconfiguration) message to add or remove another component carrier. For example, the RRC connection configuration message may include parameters of the component carrier to add. The parameters may include one or more of an identification of a RAT, a bandwidth, a component carrier frequency, an orthogonal frequency-division multiplexing (OFDM) numerology or scheme, or antenna information. Additionally or alternatively, the user plane data may include a carrier activation or deactivation message via a medium access control (MAC) control element (CE). The carrier activation message instructs the user device 102 to activate communication via the second component carrier and may include related instructions. The carrier deactivation message instructs the user device 102 to deactivate, or terminate, communication via the second component carrier and may include related instructions.

Figure 2:
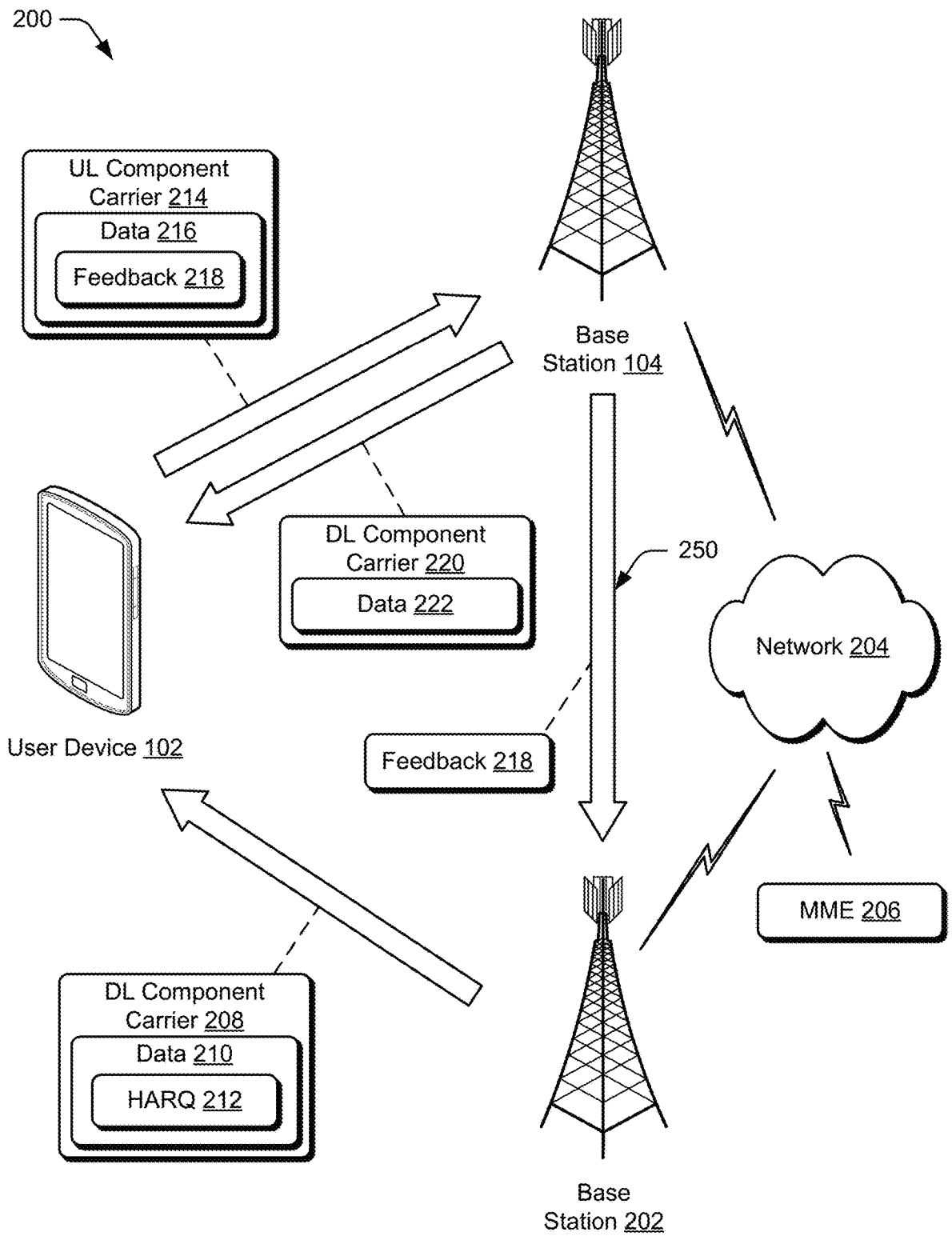
FIG. 2 illustrates an example networking environment in which the user device and base station may communicate in accordance with one or more aspects of inter-radio access technology carrier aggregation.
Figure 3:
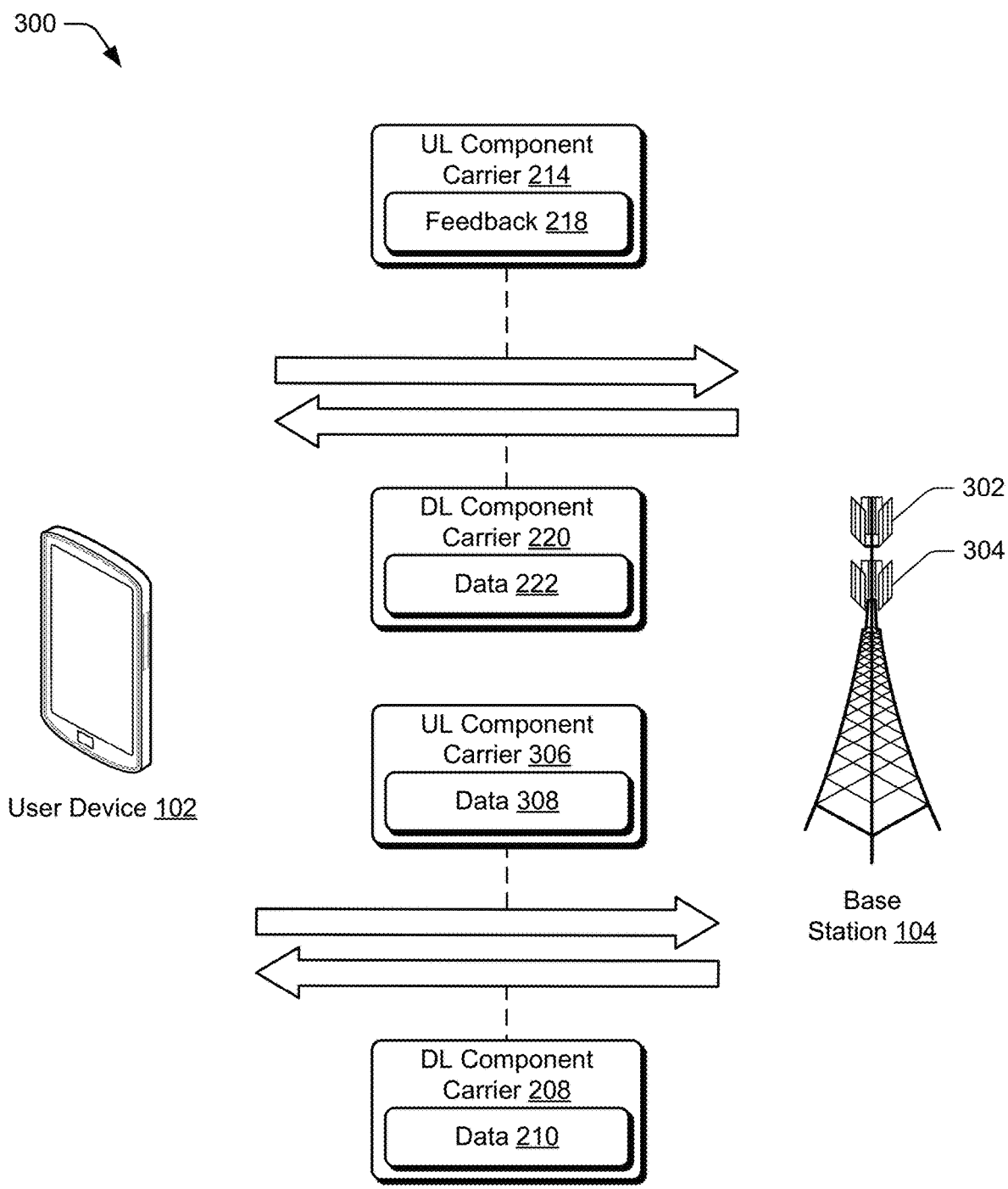
FIG. 3 illustrates an example of network communication or operations in accordance with one or more aspects of inter-radio access technology carrier aggregation.

When the wireless link 106 includes a first component carrier of a first RAT and a second component carrier of a second RAT, additional user plane data and control plane data may be communicated between the user device 102 and the base station 104 as additional inter-RAT carrier aggregation communications. For example, additional user plane data may include an ACK/NACK communication, corresponding to data received via the second component carrier, for sending via the first component carrier. The additional user plane data may include a timing advance usable by the user device 102 to configure transmission timing for communication via the second component carrier of the second RAT. The additional control plane data can include a power control command usable by the user device 102 to adjust a maximum power amplification for transmitting via the second component carrier of the second RAT. Further, the additional control plane data may include an indication that the base station 104 supports carrier aggregation communications for the first component carrier of the first RAT and the second component carrier of the second RAT. In some implementations, the additional control plane data includes handover data usable by the user device 102 to transfer the second component carrier from the base station 104 to another base station (as shown in FIGS. 2 and 3). In other examples, the additional control plane data includes a measurement report configuration that is usable by the user device 102 to transmit a measurement report via the wireless link 106. The measurement report includes signal quality data for the second component carrier of the second RAT. The measurement report may be transmitted via the first or second component carrier of the wireless link 106.

The control plane data may be transmitted via various communication channels of the downlink 110, such as a physical downlink control channel (PDCCH), a physical random access channel (PRACH), or a physical HARQ indicator channel (PHICH). The user plane data may be transmitted via various communication channels of the downlink 110, such as a physical downlink shared channel (PDSCH) or a physical random access channel (PRACH). The control plane data may include channel configuration instructions that are usable by the user device 102 to configure additional channels for communication via the first component carrier of the first RAT or the second component carrier of the second RAT. For example, the control plane data may be usable by the user device 102 to configure another PHICH for communication via the second component carrier of the second RAT.

Further, the control plane data may be transmitted as a unique communication, a portion of a preamble, or MAC layer of a communication packet. The control plane data may be transmitted via various communication channels of the downlink 110 as part of a radio resource control (RRC) message, a Downlink Control Information (DCI) message, or a carrier identification field (CIF) of the first component carrier of the first RAT.

The communication module 128 of the base station 104 includes a hardware-based transceiver including a receiver, a transmitter, and associated circuitry or other components for communicating with the user device 102 via the wireless medium. In some cases, the communication module 128 includes, or is coupled with, multiple transceivers and antenna arrays that are configured to establish and manage wireless links with multiple user devices or mobile stations. The base station 104 may communicate any suitable data or information to the user device 102 (or other mobile stations) through the downlink 110, such as a schedule of allocated resource elements, data, wireless link status information, or wireless link control information.

FIG. 2 illustrates an example networking environment 200 in which a user device and two base stations may communicate via inter-RAT carrier aggregation. The network environment 200 includes respective instances of the user device 102 and the base station 104, which provides a first component carrier of a wireless network with which the user device 102 and other mobile stations may associate. The wireless network includes a second base station 202, which provides a second component carrier of the wireless network with which the user device 102 and other mobile stations may associate. Through the wireless network, the base station 104 and the base station 202 may provide access to other networks or resources, such as a network 204 (e.g., the Internet) connected via a backhaul link (e.g., fiber network). Alternately or additionally, the networking environment 200 may include additional base stations or a mobility management entity (MME) 206 to manage the base stations of the wireless network and provide an area wide wireless network, such as a multi-component carrier network, and associated data services. For example, the MME 206 may manage the base station 104 and the base station 202 such that the base station 104 provides a first component carrier of the first RAT and the base station 202 provides the second component carrier of a second RAT.

The second component carrier includes a downlink (DL) component carrier 208 for transmitting data 210 that may include a HARQ communication 212. The HARQ communication may identify the second component carrier as the component carrier for which the HARQ communication is sent. Additionally or alternatively, the HARQ communication can include a RAT ID or a HARQ ID to provide context to the user device 102, which may then be indicated through feedback. In some implementations, the second component carrier only includes the downlink component carrier 208 and in other implementations, the second component carrier also includes an uplink component carrier (not shown).

The first component carrier includes an uplink (UL) component carrier 214 for transmitting data 216 including feedback 218. The feedback 218 may include an ACK/NACK communication and may identify the data for which the ACK/NACK is sent by the user device 102. The first component carrier also includes a downlink component carrier 220 including data 222. The uplink component carrier 214 and the downlink component carrier 220 may be collectively referred to as the first component carrier. The base station 104 transmits the feedback 218 to the base station 202.

In the context of Inter-RAT CA, the user device 102 communicates, via the uplink (UL) component carrier 214, the feedback 218 to the base station 104. The user device 102 may transmit the feedback 218 at a subframe or timeslot of the uplink component carrier 214 that is next available after analyzing the data 210 from the second component carrier. The base station 104 then communicates the feedback 218 to the base station 202 directly 250, or through the wired or wireless network 204. In some implementations (not shown), the feedback 218 is relayed to the MME 206, which provides instructions to the base station 202 based on the feedback 218.

In an example implementation, the first component carrier of the wireless link uses an LTE RAT having a first TTI. The second component carrier of the wireless link uses a 5G NR RAT having a second TTI. Inter-RAT carrier aggregation allows for the second component carrier, which has a greater downlink bandwidth than the first component carrier, to be dedicated to communication of data from the wireless network to the user device 102 without requiring network resources of the second component carrier for communicating feedback from the user device 102 directly to the base station 202. This may be beneficial for a wireless link with a high downlink volume. For example, if the user device 102 is streaming a video, transmitting, via the first component carrier, feedback or other user plane data for the second component carrier increases a bandwidth available for downloading the video stream via the second component carrier.

In another example, the first component carrier of the wireless link uses a 5G NR RAT having a first TTI and the second component carrier uses an LTE RAT having a second TTI. Inter-RAT carrier aggregation allows for the second component carrier, which has a smaller downlink bandwidth than the first component carrier, to be dedicated to communication of data from the network 204 to the user device 102 without requiring network resources for communication of data from the user device 102 directly to the base station 202. This may be beneficial when using the second component carrier to provide background data, not requiring a large bandwidth, to the user device 102. Additionally, this may be beneficial when using the second component carrier to provide a constant, or near constant, flow of data to the user device 102.

The base station 104 and the base station 202 exchange wireless link data, including the feedback 218, via a wireless or wired connection, which may be used to coordinate Inter-RAT carrier aggregation communications. For example, the user device 102 may transmit user plane data or control plane data to the base station 104 that are related to the downlink (DL) component carrier 208 of the second component carrier for communication between the base station 202 and the user device 102. The base station 104 then transmits the user plane data or the control plane data to the base station 202. This may be via a direct communication 250 from the base station 104 to the base station 202, or may be through the network 204. As shown, the second component carrier for communication between the base station 202 and the user device 102 does not include an uplink component carrier, so the user device 102 instead communicates to the base station 202 through the base station 104. This allows more resources of the second component carrier to be available for the downlink component carrier 208.

The user device 102 and the base stations 104 and 202 may communicate through any suitable type or combination of channels, message exchanges, or network management procedures. For example, the user device 102 may communicate to one or both of the base station 104 or 202 via a PUCCH. The PUCCH may be useful to transmit, to the base stations 104 or 202, feedback such as one or more of ACK/NACK communications, sounding reference signals, channel quality indicators (CQI), multiple-input-multiple-output (MIMO) feedback such as a rank indicator (RI) or a precoding matrix indicator (PMI), scheduling requests for uplink transmission, or binary phase-shift keying (BPSK) or quadrature phase-shift keying (QPSK) for PUCCH modulation.

The user device 102 may send additional data or other information to the base station 104 via a PUSCH. The PUSCH includes RRC communications, uplink control information (UCI) messages, and application data. The PUSCH is typically the channel on which application data is transmitted from the user device 102 to the base stations 104 or 202. However, the feedback 218, such as ACK/NACK communications may also be transmitted over the PUSCH.

The base stations 104 or 202 may transmit data to the user device 102 via a PDCCH. The PDCCH can be used by the base stations 104 or 202 to communicate a DCI or RRC message to the user device 102. In some aspects, the DCI includes identification of wireless link resources to be used for communication of data to the user device 102. The DCI may also include a modulation scheme and coding/decoding information for the user device 102 to access the data 210 or 216 communicated to the user device 102 via the downlink component carrier 208 or the downlink component carrier 220. The base stations 104 or 202 may communicate additional data to the user device 102 via a PDSCH. For example, application data such as video streaming, media sharing, or gaming data can be transmitted to the user device 102 via the PDSCH. Alternately or additionally, the base stations 104 or 202 may send additional data to the user device 102 via a PHICH. The PHICH may include a request for ACK/NACK for data received by the user device 102.

FIG. 3 illustrates another example of network communication or operations 300 in accordance with one or more aspects of inter-radio access technology carrier aggregation. In this example, the base station includes a first transceiver 302 and a second transceiver 304. The base station 104 communicates with the user device 102 via the first transceiver 302 using the uplink component carrier 214 and the downlink component carrier 220, which operate according to a first RAT and have a first TTI. In some implementations, the uplink component carrier 214 facilitates communication of application data from the user device 102 to the base station 104 in addition to the feedback 218. The base station 104 may also communicate with the user device 102 via the second transceiver 304 using the downlink component carrier 208 and an uplink component carrier 306, both of which operate according to a second RAT. The uplink component carrier 306 may include data 308 such as application data.

In an example implementation, the base station 104 uses the second transceiver 304 to transmit the data 210 via the downlink component carrier 208 according to the second RAT. The user device 102 analyzes the data 210 to determine whether data packets of the data 210 were received successfully or unsuccessfully. Based on the determination, the user device 102 generates an ACK/NACK communication as feedback 218 relating to the data 210. The user device then transmits the feedback 218 over the uplink component carrier 214 to the base station 104 according to the first RAT. The base station 104 can then use the ACK/NACK communication to determine which data packets of the data 210 should be retransmitted to the user device 102. The base station 104 may also use the ACK/NACK communication to assess a channel quality over which the data 210 was transmitted and manage transmissions of additional data via the downlink component carrier 208.

Figure 4:
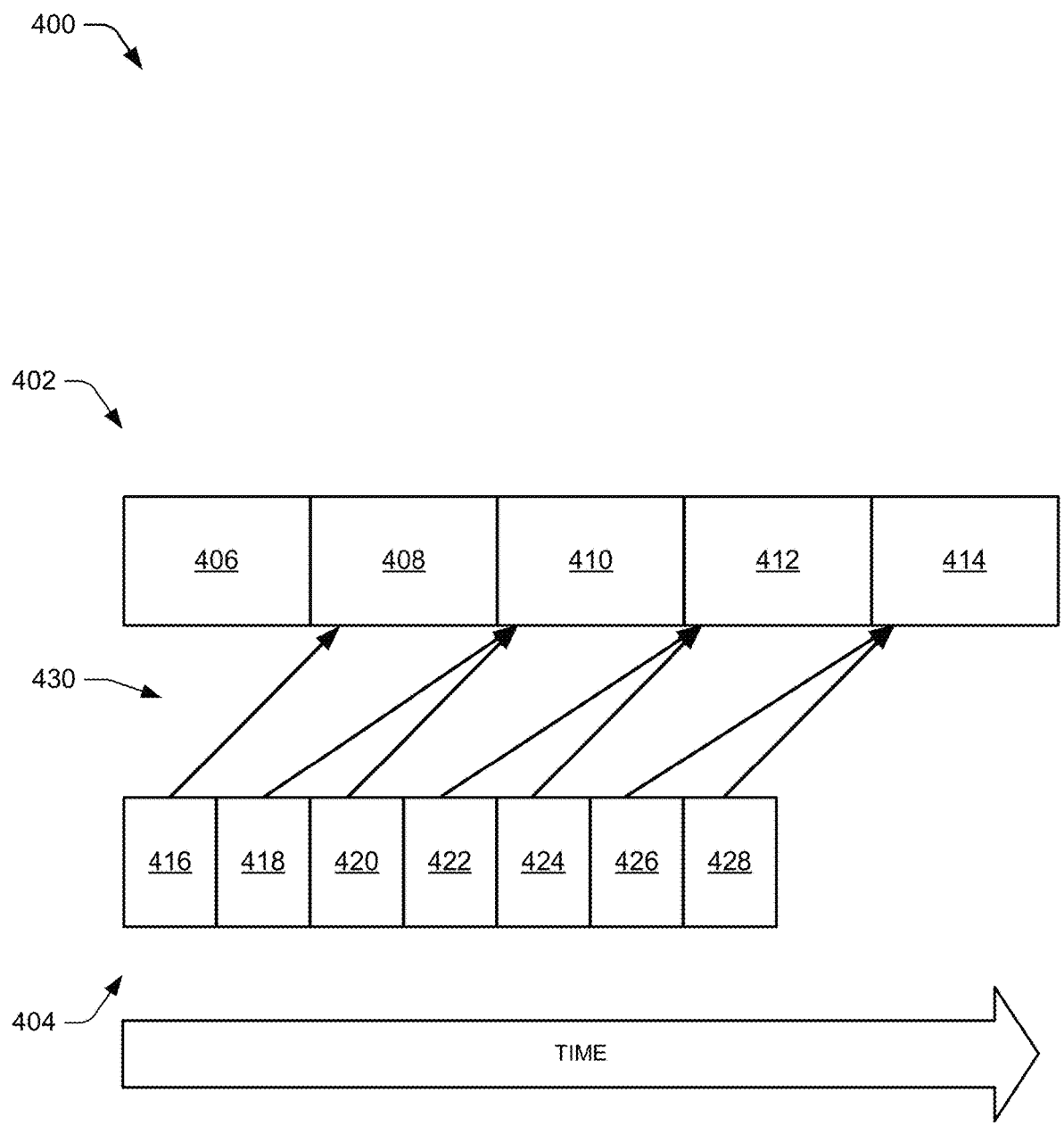
FIG. 4 illustrates example sets of subframes of a first component carrier and a second component carrier in accordance with one or more aspects of inter-radio access technology carrier aggregation.

FIG. 4 illustrates a pair 400 of contemporaneous sets of subframes including a set 402 of subframes and a set 404 of subframes. The set 402 of subframes is assigned a first component carrier and the set 404 of subframes is assigned to a second component carrier. The set 402 of subframes includes subframes 406, 408, 410, 412, and 414 having a TTI indicated by a width of the subframes of the set 402. The set 404 of subframes includes subframes 416, 418, 420, 422, 424, 426, and 428 having a TTI indicated by a width of the subframes of the set 404.

Feedback for data received over the set 404 of subframes is transmitted according to the TTI of the subframes of the set 402 of the first component carrier as indicated at 430. For example, data received at the subframe 416 is analyzed by the user device 102 to determine which data packets of the data were received successfully. The user device 102 then transmits feedback, including indications based on the determination, during a next available uplink subframe, which is the subframe 408. The data received at the subframe 418 is also analyzed to determine which data packets were received successfully. Although the subframe 408 begins at a termination of the subframe 418, the subframe 410 is a next available uplink subframe because the analysis consumes some amount of time. Thus, in some implementations, the analyzing is performed at least partially during the subframe 408, and the next available uplink subframe is based on a subframe that follows the subframes during which the user device analyzes data of a downlink subframe. However, in some implementations, the next available subframe is a subframe that follows a predetermined delay after receiving data.

The data received at the subframe 420 is received after the data received at the subframe 418. The data received at the subframe 420 is analyzed to determine whether additional data packets of the additional data were successfully or unsuccessfully received by the user device 102. The feedback for the data received at the subframe 420 may then be transmitted, in a single feedback communication, along with the feedback for the data received at the subframe 418.

When transmitting the feedback for data received via the set 404 of subframes, the feedback can be added to subframes of the set 402 of subframes in various ways. For example, the feedback can be superimposed onto a channel of the set 402 of subframes. In one example, the feedback is transmitted over resource elements added to a channel of the set 402 of the subframes. In another example, a new waveform is generated and added to a subframe of the PUCCH or PUSCH of the first component carrier. Alternatively, the feedback punctures a subframe of the set 402 of subframes. This can include reassigning one or more resource elements, which were otherwise assigned to carry other data over the first component carrier, to transmit the feedback.

In one implementation, the set 404 of subframes may be configured with a TTI that is less than a TTI of the set 402 of subframes. In an example implementation, the set 402 of subframes is a set of 4G LTE subframes. The set 402 of subframes may be configured with a TTI of about 1.0 ms. The set 404 of subframes may be a set of 5G NR subframes configured with a fixed TTI that is less than 1.0 ms, such as 0.5 ms, 0.1 ms, or less than 0.1 ms. Alternatively, the set 404 of subframes may be configured with a TTI that is dynamically configurable, based on needs of the component carrier to which they are assigned. Because 5G NR subframes have a wider bandwidth than those of 4G LTE, the set 404 of subframes can carry more data per second than the set 402 of subframes. This allows for the 5G NR subframes to be shorter in time, while still carrying a practical amount of data.

The set 402 of subframes is referenced as uplink subframes through which the user device 102 transmits feedback for data received from the base station 202 via the set 404 of subframes. However, the set 402 of subframes may alternatively represent downlink subframes through which the base station 104 transmits feedback for data received by itself or another base station, such as the base station 202, of the wireless network via the set 404 of subframes.

Figure 5:
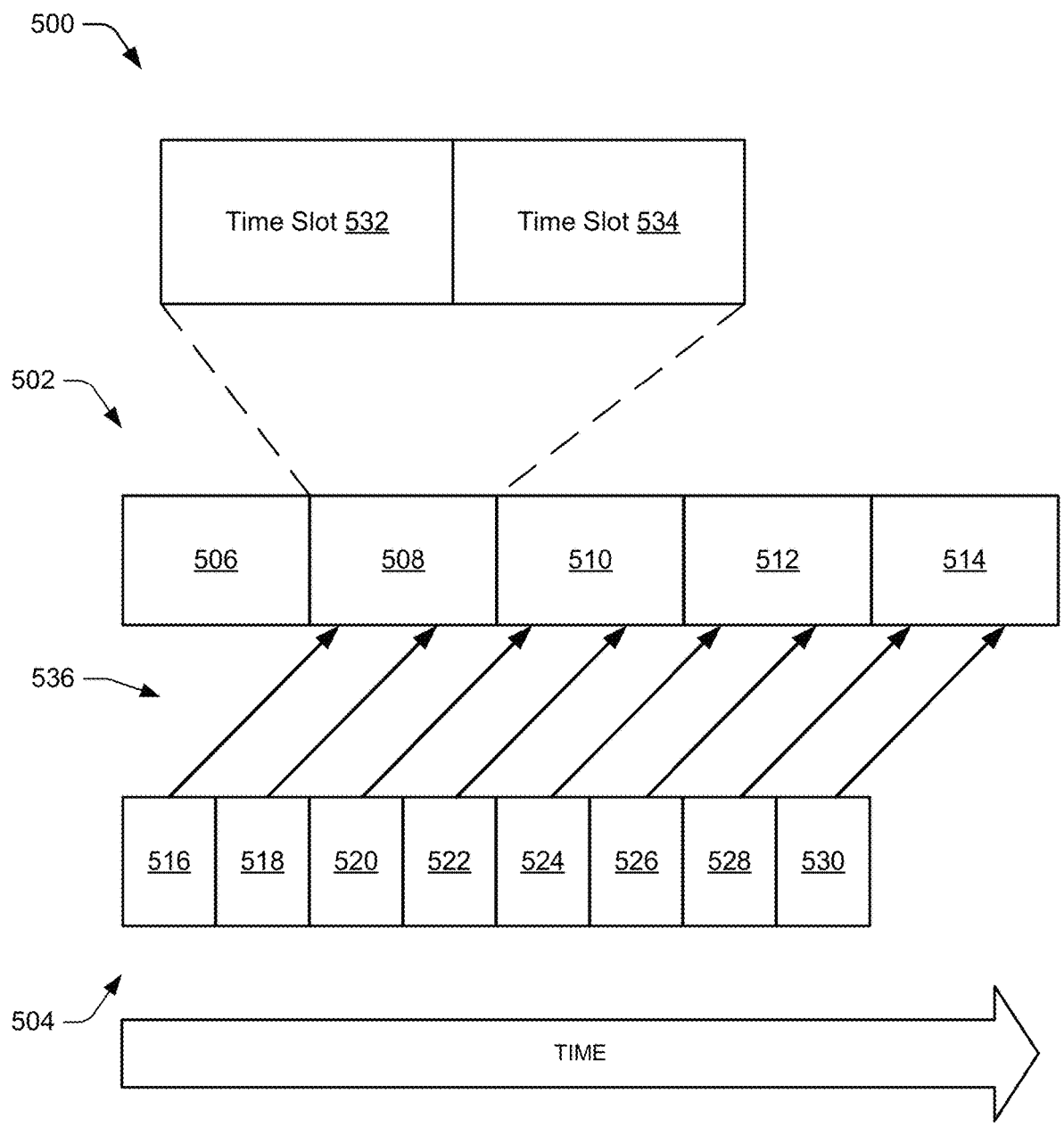
FIG. 5 illustrates example sets of other subframes of a first component carrier and a second component carrier in accordance with one or more aspects of inter-radio access technology carrier aggregation.

FIG. 5 illustrates a pair 500 of contemporaneous sets of subframes including a set 502 of subframes and a set 504 of subframes. The set 502 of subframes is part of a first component carrier and the set 504 of subframes is part of a second component carrier. In aspects, the set 502 may be a set of 4G LTE subframes and the set 504 may be a set of 5G NR subframes. The set 502 of subframes includes subframes 506, 508, 510, 512, and 514 having a TTI indicated by a width of the subframes of the set 502. The set 504 of subframes includes subframes 516, 518, 520, 522, 524, 526, 528, and 530, which have a TTI indicated by a width of the subframes of the set 504. The subframes of the set 502 are divided into time slots, as shown by the time slots 532 and 534 of the subframe 508. These time slots allow for initiation of a transmission for a second time slot after beginning transmission for a first time slot. The set 502 may be assigned to a PUCCH or another channel that provides this configuration.

Feedback for data received over the set 504 of subframes is transmitted during subframes of the set 502 as indicated at 536. The feedback may be transmitted in a similar manner as described relative to FIG. 4. Data received at the subframe 516 is analyzed by the user device 102 to determine which data packets of the data were received successfully. The user device 102 then transmits feedback, based on the determination, during a next available uplink subframe, which is the subframe 508. The data received at the subframe 518 is analyzed to determine which data packets were received successfully and a feedback communication is generated. Because of the configuration of the set 502 of subframes, the feedback for the data received at the subframe 518 can be transmitted at the time slot 534, which is the next available uplink time slot after analyzing the data.

In the illustrated example, the time slot 532 begins at a termination of the subframe 518, but the time slot 534 is a next available uplink time slot because the analysis consumes some amount of time. Thus, the analyzing is performed at least partially during the time slot 532, and the next available uplink time slot 534 that follows the time slot 532 is at least one time slot after receiving the data.

The set 502 of subframes is referenced as uplink subframes through which the user device 102 transmits feedback for data received from the base station 202 via the set 504 of subframes. However, the set 502 of subframes may alternatively represent downlink subframes through which the base station 104 transmits feedback for data received by itself or another base station, such as the base station 202, of the wireless network via the set 504 of subframes.

Figure 6:
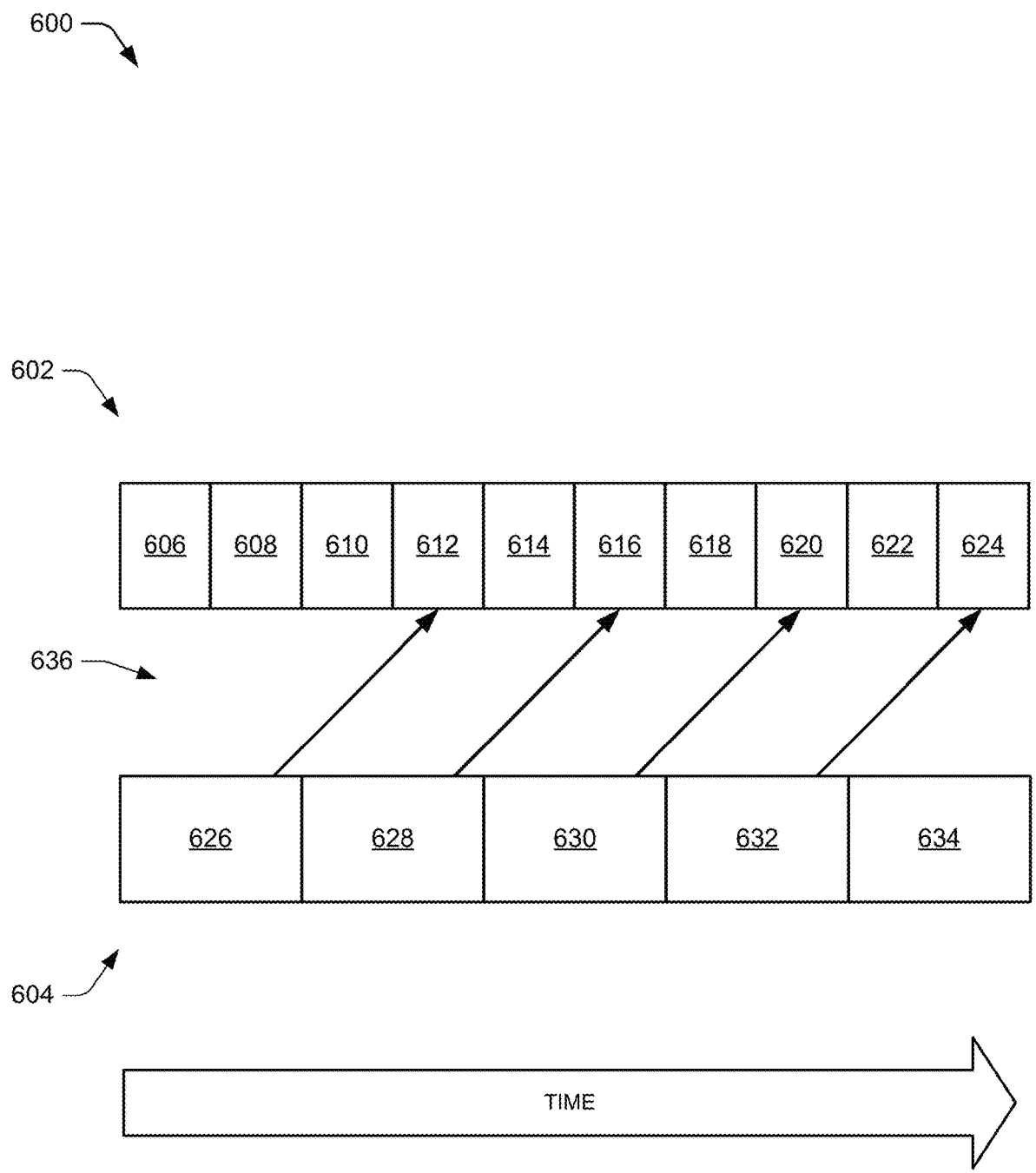
FIG. 6 illustrates example sets of other subframes of a first component carrier and a second component carrier in accordance with one or more aspects of inter-radio access technology carrier aggregation.

FIG. 6 illustrates a pair 600 of contemporaneous sets of subframes including a set 602 of subframes and a set 604 of subframes. The set 602 of subframes is part of a first component carrier and the set 604 of subframes is part of a second component carrier. The set 602 may be a set of 5G NR subframes and the set 604 may be a set of 4G LTE subframes. The set 602 of subframes includes subframes 606, 608, 610, 612, 614, 616, 618, 620, 622, and 624 having a TTI indicated by a width of the subframes of the set 602. The set 604 of subframes includes subframes 626, 628, 630, 632, and 634 having a TTI indicated by a width of the subframes of the set 604. In this implementation, feedback for data received over the component carrier with a longer TTI is transmitted over the component carrier with a shorter TTI. In other words, the set 604 of subframes is configured with a TTI that is greater than a TTI of the set 602 of subframes. This can improve latency for providing feedback for the component carrier with the longer TTI.

Feedback for data received over the set 604 of subframes is transmitted during subframes of the set 602 as indicated at 636. The feedback may be transmitted in a similar manner as described relative to FIG. 4. Data received at the subframe 626 is analyzed by the user device 102 to determine which data packets of the data were received successfully. The user device then transmits feedback, including indications based on the determination, during a next available uplink subframe, which is the subframe 612. This improves latency of feedback because, if the feedback were to be transmitted over the set 604 of subframes, the feedback would be delayed until at least the subframe 630.

Although illustrated as about half of a duration of the TTI of the set 604 of subframes, the TTI of the set 602 of subframes may be any fraction of the duration of the TTI of the set of 604. For example, the TTI of the set 602 of subframes may be a fraction of the duration of the TTI of the set of 604 that allows for non-alignment of terminations of subframes of the set 604 of subframes with terminations of subframes of the set 602 of subframes. In such cases, latency may be further improved if a subframe of the set 602 begins shortly after termination of the subframes of the set 602 of subframes, but with a sufficient delay to allow for analysis of the data transmitted over the subframes of the set 602 of subframes.

The set 602 of subframes is referenced as uplink subframes through which the user device 102 transmits feedback for data received from the base station 202 via the set 604 of subframes. However, the set 602 of subframes may alternatively represent downlink subframes through which the base station 104 transmits feedback for data received by itself or another base station, such as the base station 202, of the wireless network via the set 604 of subframes.

Figure 7:
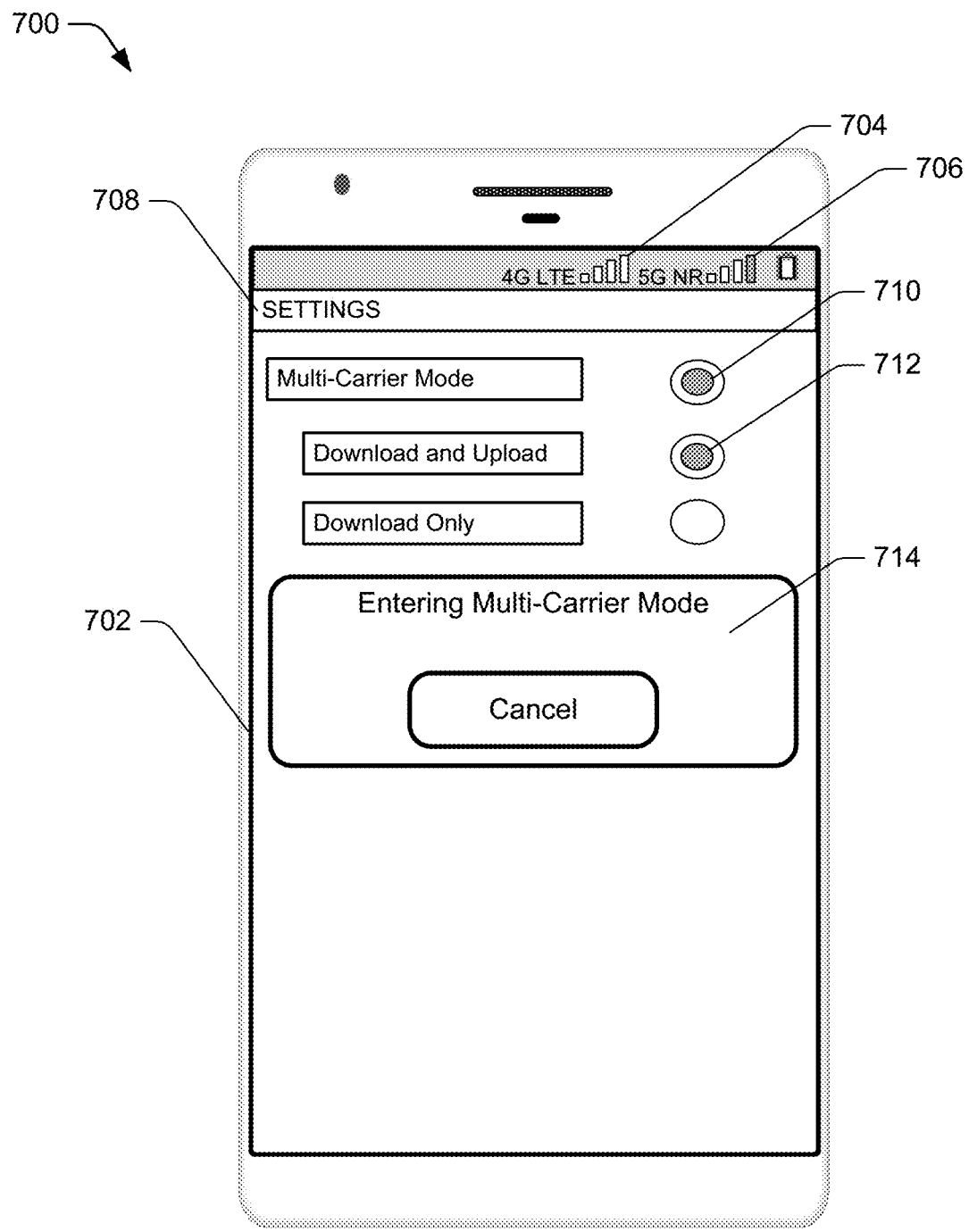
FIG. 7 illustrates an example user interface of a user device through which one or more aspects of inter-radio access technology carrier aggregation can be implemented.

FIG. 7 illustrates an example user interface 700 of the user device 102 through which one or more aspects of inter-radio access technology carrier aggregation can be implemented. In this example, the user interface 700 is presented through a visible portion of a display 702 for providing output to a user. The display 702 may also include, or be integrated with, a touch screen or touch-sensitive overlay for receiving touch input from the user. The display 702 may also display a signal-quality indicator 704 of the first component carrier of the first RAT (shown as 4G LTE) and a signal-quality indicator 706 of the second component carrier of the second RAT (shown as 5G NR). In some cases, the display 702 provides or makes accessible a settings menu 708 through which the user interface 700 can receive input 710 to select a multi-carrier communication mode. For example, the settings menu 708 for the multi-carrier communication modes can receive an input 712 to request one or more modes, such as a download and upload mode or a download only mode.

Additionally or alternatively, the user device 102 may provide a notification 714 via the user interface 700 to indicate that the user device 102 is entering the multi-carrier mode. The notification 714 is illustrated in this example as a pop-up notification in the display 702, however, other forms of notification 714 may be implemented in addition or in alternative to the pop-up notification. For example, the user device 102 may provide an audible notification, a visible notification via a light emitting diode (LED) indicator that is separate from the display 702, or a motion-based notification such as a vibration of the user device 102.

The user interface 700 is but one of many possible user interfaces for implementing inter-RAT carrier aggregation. Although the user device 102 is illustrated as a smart phone with a touch screen, alternative user interfaces may be implemented by the user device 102. For example, the user device 102 may be implemented as a laptop with a user interface including, for example, one or more of a mouse, a track pad, a keyboard, a microphone, a monitor, a projector screen, or speakers. In some implementations, the user interface does not include the settings menu 708 for receiving the inputs 710 or 712, but rather, the user device 102 enters the multi-carrier mode automatically and without receiving user input.

Techniques for Inter-RAT Carrier Aggregation

Figure 8:
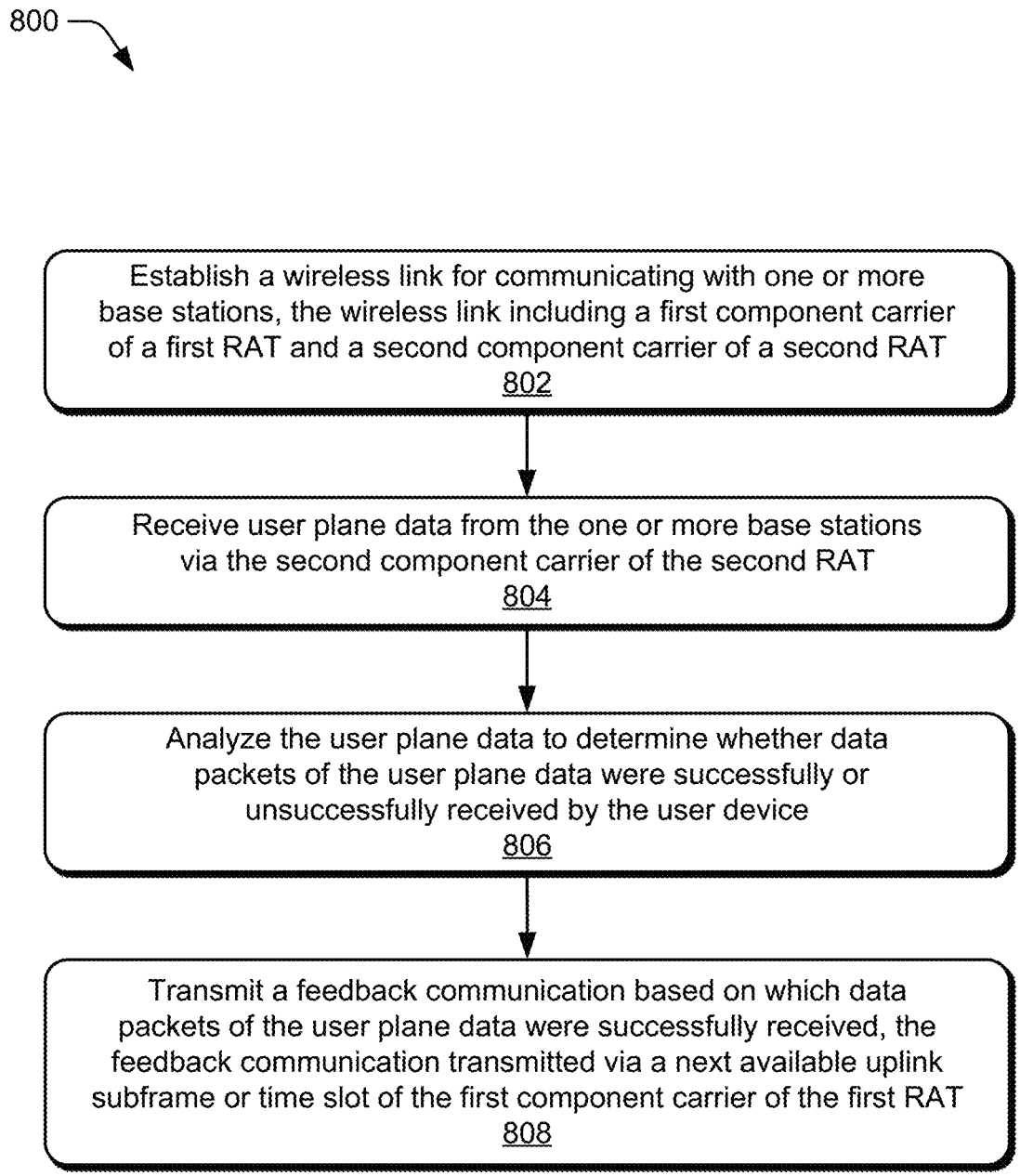
FIG. 8 illustrates an example method for inter-radio access technology carrier aggregation.
Figure 10:
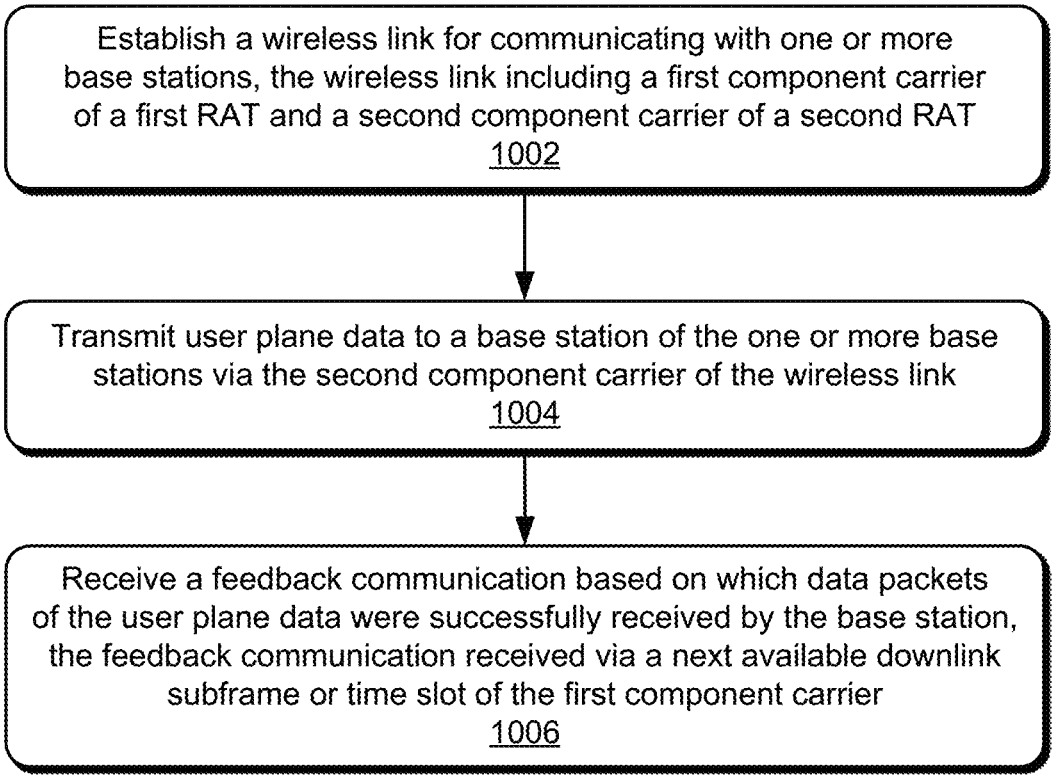
FIG. 10 illustrates another example method for inter-radio access technology carrier aggregation.

FIGS. 8-10 depict methods for implementing inter-RAT carrier aggregation in wireless networks. These methods are shown as sets of blocks that specify operations performed but are not necessarily limited to the order or combinations shown for performing the operations by the respective blocks. For example, operations of different methods may be combined, in any order, to implement alternate methods without departing from the concepts described herein. In portions of the following discussion, the techniques may be described in reference to FIGS. 1-7, reference to which is made for example only. The techniques are not limited to performance by one entity or multiple entities operating on one device, or those described in these figures.

FIG. 8 illustrates an example method 800 for inter-radio access technology carrier aggregation, including operations performed by an inter-RAT carrier aggregation module of a user device, such as the Inter-RAT CA module 116 of the user device 102. In some aspects, operations of the method 800 may be implemented to improve efficiency of transmitting and receiving user plane data for a wireless link including two or more component carriers using different RATs having different TTIs.

At operation 802, a user device establishes, via a transceiver of the user device, a wireless link for communicating with one or more base stations of a wireless network. The wireless link includes a first component carrier of a first RAT having a first TTI and a second component carrier of a second RAT having a second TTI. The second TTI is different from the first TTI. For example, the user device 102 establishes a wireless link for communicating with the base station 104 via a first component carrier and with the base station 202 via a second component carrier. The first component carrier includes the uplink component carrier 214 and the downlink component carrier 220. The second component carrier includes the downlink component carrier 208 and may also include the uplink component carrier 306. In an example, the first component carrier may operate using an LTE RAT having a TTI of about 1.0 ms, and the second component carrier may operate using a 5G NR RAT having a TTI of less than 1.0 ms, such as 0.5 ms, 0.1 ms, or less than 0.1 ms. Additionally, the TTI of the second component carrier may be dynamically adjusted based on needs, such as a type or volume of data to be communicated, of the second component carrier.

At operation 804, the user device receives data from one of the base stations via the second component carrier of the second RAT. For example, the user device 102 receives the data 210 including the HARQ communication 212 via the downlink component carrier 208 of the second component carrier. At operation 806, the user device analyzes the data to determine whether data packets of the data were successfully or unsuccessfully received by the user device 102. For example, the user device 102 employs a module, such as the communication module 120, to decode data packets of the data 210.

At operation 808, the user device transmits a feedback communication based on which data packets of the data were successfully received. The user device transmits the feedback to the base station via the transceiver of the user device. The feedback communication is transmitted via a next available uplink subframe or time slot of the first component carrier of the first RAT. For example, the user device 102 transmits feedback according to a process as described relative to any of FIGS. 4-6.

FIG. 9 illustrates an example method 900 for inter-radio access technology carrier aggregation, including operations performed by an inter-RAT carrier aggregation module of a base station, such as the base station Inter-RAT CA module 126 of the base station 104. In some aspects, operations of the method 900 may be implemented to improve efficiency of transmitting and receiving user plane data for a wireless link including two or more component carriers using different RATs having different TTIs.

At operation 902, a base station establishes a wireless link for communicating with a user device over a wireless network. The wireless link includes a first component carrier of a first RAT facilitating communication between the base station and the user device. For example, the base station 104 establishes the wireless link 106 with the user device 102. The base station 104 communicates with the user device 102 via the uplink component carrier 214 and the downlink component carrier 220.

At operation 904, the base station receives, via the first component carrier, a feedback communication including feedback for data received by the user device over a second component carrier of the wireless link. The second component carrier is provided by a second base station of the wireless network. For example, the base station 104 receives the feedback 218 via the uplink component carrier 214. The feedback 218 relates to the data 210 received over the downlink component carrier 208 of the second component carrier provided by the base station 202.

At operation 906, the base station communicates the feedback communication to another device of the wireless network. For example, the base station 104 transmits the feedback 218 to one of the base station 202 or the MME 206. The base station 104 or the MME 206 use the feedback to control future transmissions over the downlink component carrier 208. For example, the base station 104 or the MME 206 may retransmit the unsuccessfully received data packets or modify a resource allocation to transmit future data over different resources.

FIG. 10 illustrates an example method 1000 for inter-radio access technology carrier aggregation, including operations performed by an inter-RAT carrier aggregation module of a user device, such as the Inter-RAT CA module 116 of the user device 102. In some aspects, operations of the method 1000 may be implemented to improve efficiency of transmitting and receiving user plane data for a wireless link including two or more component carriers using different RATs having different TTIs.

At operation 1002, a user device establishes, via a transceiver of the user device, a wireless link for communicating with one or more base stations of a wireless network. The wireless link includes a first component carrier of a first RAT having a first TTI and a second component carrier of a second RAT having a second TTI. The second TTI is different from the first TTI. For example, the user device 102 establishes a wireless link for communicating with the base station 104 via a first component carrier and with the base station 202 via a second component carrier. Examples of the first and second component carriers are described above.

At operation 1004, the user device transmits data to a base station of the one or more base stations via the second component carrier of the wireless link. In one example, the user device 102 transmits the data 308 to the base station 104 via the uplink component carrier 306 of the second component carrier of the wireless link 106.

At operation 1006, the user device receives a feedback communication based on which data packets of the data were successfully received by the base station. In aspects, the feedback communication is received via a next available downlink subframe or time slot of the first component carrier. For example, the user device 102 receives a feedback communication as part of the data 222 received via the downlink component carrier 220 of the first component carrier. The next available downlink subframe or time slot may be determined according to a process as described relative to any of FIGS. 4-6.

Example Communication Device

Figure 11:
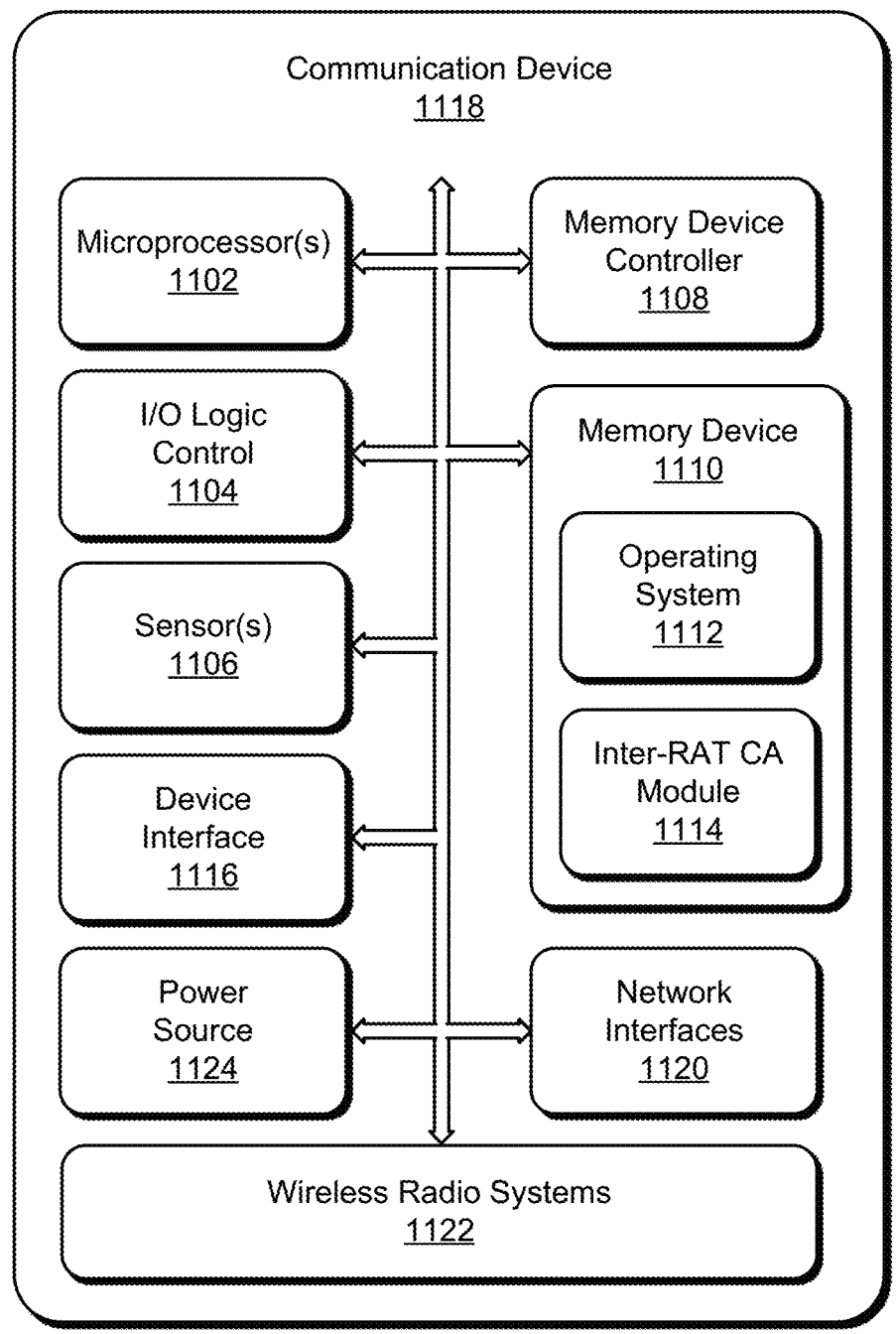
FIG. 11 illustrates an example communication device.

FIG. 11 illustrates an example communication device 1100 that can be implemented as the user equipment 102 in accordance with one or more aspects of inter-RAT carrier aggregation as described herein. The example communication device 1100 may be any type of mobile communication device, computing device, client device, mobile phone, tablet, communication, entertainment, gaming, media playback, and/or other type of device.

The communication device 1100 can be integrated with electronic circuitry, microprocessors, memory, input output (I/O) logic control, communication interfaces and components, as well as other hardware, firmware, and/or software to implement the device. Further, the communication device 1100 can be implemented with various components, such as with any number and combination of different components as further described with reference to the user device 102 shown in FIGS. 1-3.

In this example, the communication device 1100 includes one or more microprocessors 1102 (e.g., microcontrollers or digital signal processors) that process executable instructions. The device also includes an input-output (I/O) logic control 1104 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits.

The one or more sensors 1106 can be implemented to detect various properties such as acceleration, temperature, humidity, supplied power, proximity, external motion, device motion, sound signals, ultrasound signals, light signals, global-positioning-satellite (GPS) signals, radio frequency (RF), other electromagnetic signals or fields, or the like. As such, the sensors 1106 may include any one or a combination of temperature sensors, humidity sensors, accelerometers, microphones, optical sensors up to and including cameras (e.g., charged coupled-device or video cameras), active or passive radiation sensors, GPS receivers, and radio frequency identification detectors.

The communication device 1100 includes a memory device controller 1108 and a memory device 1110 (e.g., the computer-readable storage media 114), such as any type of a nonvolatile memory and/or other suitable electronic data storage device. The communication device 1100 can also include various firmware and/or software, such as an operating system 1112 that is maintained as computer-executable instructions by the memory and executed by a microprocessor. The device software may also include an inter-RAT CA application 1114 that implements aspects of inter-RAT carrier aggregation. The computer-readable storage media described herein excludes propagating signals or carrier waves.

The communication device 1100 also includes a device interface 1116 to interface with another device or peripheral component and includes an integrated data bus 1118 that couples the various components of the communication device 1100 for data communication between the components. The data bus 1118 may also be implemented as any one or a combination of different bus structures and/or bus architectures.

The device interface 1116 may receive input from a user and/or provide information to the user (e.g., as a user interface), and a received input can be used to determine a setting. The device interface 1116 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 1116 may also receive inputs from any number of peripherals, such as buttons, a keypad, a switch, a microphone, and an imager (e.g., a camera device).

The communication device 1100 can include network interfaces 1120, such as a wired and/or wireless interface for communication with other devices via Wireless Local Area Networks (WLANs), wireless Personal Area Networks (PANs), and for network communication, such as via the Internet. The network interfaces 1120 may include Wi-Fi, Bluetooth™, BLE, Near Field Communication (NFC), and/or IEEE 802.15.4. The communication device 1100 also includes wireless radio systems 1122 for wireless communication with cellular and/or mobile broadband networks. Each of the different radio systems can include a radio device, antenna, and chipset that is implemented for a particular wireless communications technology. Some examples of radio systems implemented in the user device 102, the base station 104, and/or the base station 202 can include one or more antennas, an RF front end, an LTE transceiver, and/or a 5G NR transceiver. The communication device 1100 also includes a power source 1124, such as a battery and/or to connect the device to line voltage. An alternating current (AC) power source may also be used to charge the battery of the device.

Although techniques using, and apparatuses for implementing, inter-RAT carrier aggregation have been described in language specific to features or methods, it is to be understood that the subject of the appended claims is not necessarily limited to the specific features or methods described. Rather, the specific features and methods are disclosed as example ways in which inter-radio access technology carrier aggregation can be implemented.

What is claimed is:

1. A method for carrier aggregation performed by a user device, the method comprising:
   establishing, via a transceiver of the user device, a wireless link for communicating with one or more base stations of a wireless network, the wireless link including:
      a first component carrier of a first radio access technology (RAT) having a first transmission time interval (TTI); and
      a second component carrier of a second RAT having a second TTI, the second RAT being different from the first RAT and the second TTI being different from the first TTI;
   receiving user plane data from a base station of the one or more base stations via the second component carrier of the second RAT;
   generating a feedback communication by analyzing the user plane data to make a determination on whether data packets of the user plane data were successfully or unsuccessfully received by the user device and indicating the determination in the feedback communication; and
   transmitting, to another base station of the one or more base stations and via the transceiver of the user device, the feedback communication by puncturing a next available uplink subframe or time slot of the first component carrier of the first RAT, the puncturing comprising reassigning, for transmitting the feedback communication, one or more resource elements that, prior to being reassigned, were assigned to carry other data over the first component carrier.

2. The method as recited in claim 1, wherein:
   the user device analyzes the user plane data during at least one subframe or time slot of the first component carrier; and
   the next available uplink subframe or time slot follows the at least one subframe or time slot.

3. The method as recited in claim 1, wherein the user plane data includes a hybrid automatic repeat request (HARQ) communication.

4. The method as recited in claim 3, wherein the HARQ communication identifies the second component carrier of the second RAT as a component carrier for which the HARQ communication is sent.

5. The method as recited in claim 1, wherein the feedback communication includes an acknowledgement/negative acknowledgement (ACK/NACK) communication.

6. The method as recited in claim 5, wherein the ACK/NACK communication identifies the user plane data as data for which the ACK/NACK communication is sent by the user device.

7. The method as recited in claim 1, further comprising:
   receiving additional user plane data from the one or more base stations and via the second component carrier of the second RAT, the additional user plane data being received during a subframe or time slot after receiving the user plane data;
   analyzing the additional user plane data to determine whether additional data packets of the additional user plane data were successfully or unsuccessfully received by the user device; and
   transmitting, to the other base station via the transceiver of the user device, additional feedback within the feedback communication, wherein the additional feedback is based on which data packets of the additional user plane data were successfully received.

8. The method as recited in claim 1, wherein the feedback communication is transmitted by the user device over a physical uplink control channel (PUCCH) of the wireless link.

9. The method as recited in claim 1, wherein the feedback communication is transmitted by the user device over a physical uplink share channel (PUSCH) of the wireless link.

10. The method as recited in claim 1, wherein:
   the first RAT is a Long Term Evolution (LTE) RAT and the second RAT is a fifth generation (5G) new radio (NR) RAT; or
   the first RAT is a 5G NR RAT and the second RAT is an LTE RAT.

11. A method for carrier aggregation performed by a user device, the method comprising:
   establishing, via a transceiver of the user device, a wireless link for communicating with one or more base stations of a wireless network, the wireless link including:
      a first component carrier of a first radio access technology (RAT) having a first transmission time interval (TTI); and
      a second component carrier of a second RAT having a second TTI, the second RAT being different from the first RAT and the second TTI being different from the first TTI;
   receiving, via the transceiver of the user device, user plane data from a base station of the one or more base stations over the second component carrier of the second RAT;

generating a feedback communication by analyzing the user plane data to make a determination on whether data packets of the user plane data were successfully or unsuccessfully received by the user device and indicating the determination in the feedback communication; and transmitting, to the base station via the transceiver of the user device, the feedback communication by puncturing a next available uplink subframe or time slot of the first component carrier of the first RAT, the puncturing comprising reassigning, for transmitting the feedback communication, one or more resource elements that, prior to being reassigned, were assigned to carry other data over the first component carrier.

12. The method as recited in claim 11, wherein:
the user plane data is received by the user device during a subframe or time slot of the second component carrier that terminates during an uplink subframe or time slot of the first component carrier;
analyzing the user plane data is performed at least partially during the uplink subframe or time slot of the first component carrier; and
the next available uplink subframe or time slot follows the uplink subframe or time slot.

13. The method as recited in claim 11, wherein:
the user plane data is received by the user device during a subframe or time slot of the second component carrier that terminates at or about a time to begin an uplink subframe or time slot of the first component carrier;
analyzing the user plane data is performed at least partially during the uplink subframe or time slot of the first component carrier; and
the next available uplink subframe or time slot follows the uplink subframe or time slot.

14. The method as recited in claim 11, wherein the second component carrier of the second RAT supports a greater downlink bandwidth than a downlink bandwidth supported by the first component carrier of the first RAT.

15. A user device comprising:
one or more processors;
a hardware-based transceiver; and
computer-readable storage medium that, responsive to execution by the one or more processors, implement an inter-radio access technology carrier aggregation (Inter-RAT CA) module that direct the user device to perform operations comprising:
establishing, via the hardware-based transceiver of the user device, a wireless link for communicating with one or more base stations of a wireless network, the wireless link including:
a first component carrier of a first radio access technology (RAT) having a first transmission time interval (TTI); and
a second component carrier of a second RAT having a second TTI, the second RAT being different from the first RAT and the second TTI being different from the first TTI; and
receiving, via the hardware-based transceiver of the user device, user plane data from a base station of the one or more base stations via the second component carrier of the first RAT;
generating a feedback communication by analyzing the user plane data to make a determination on whether data packets of the user plane data were successfully or unsuccessfully received by the user device and indicating the determination in the feedback communication; and
transmitting, to another base station via the hardware-based transceiver of the user device, the feedback communication by puncturing an uplink subframe or time slot of the first component carrier of the first RAT, the puncturing comprising reassigning, for transmitting the feedback communication, one or more resource elements that, prior to being reassigned, were assigned to carry other data over the first component carrier.

16. The user device as recited in claim 15, wherein:
the first RAT is a Long Term Evolution (LTE) RAT and the second RAT is a 5th generation (5G) new radio (NR) RAT; or
the first RAT is a 5G NR RAT and the second RAT is an LTE RAT.

17. The user device as recited in claim 15, wherein the second TTI is dynamically adjustable based on a type or volume of data to be transmitted via the second component carrier.

18. The user device as recited in claim 15, wherein the other base station receives the feedback communication via one of a physical uplink control channel (PUCCH) or a physical uplink share channel (PUSCH).

19. The user device as recited in claim 15, wherein the feedback communication includes an identification of one or more of the second component carrier, the second RAT, the base station, or a hybrid automatic repeat request (HARQ) relating to the user plane data.

20. The method as recited in claim 11, further comprising:
receiving, as part of the user plane data, a hybrid automatic repeat request (HARQ) communication.

* * * * *